United States Patent
Lei et al.

(10) Patent No.: US 12,471,004 B2
(45) Date of Patent: Nov. 11, 2025

(54) PRIMARY SYNCHRONIZATION SIGNAL DESIGN

(71) Applicant: QUALCOMM Incorporated, San Diego, CA (US)

(72) Inventors: Jing Lei, San Diego, CA (US); Yongle Wu, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 18/326,601

(22) Filed: May 31, 2023

(65) Prior Publication Data
US 2024/0406843 A1    Dec. 5, 2024

(51) Int. Cl.
*H04W 24/10*  (2009.01)
*H04W 48/08*  (2009.01)

(52) U.S. Cl.
CPC .......... *H04W 48/08* (2013.01); *H04W 24/10* (2013.01)

(58) Field of Classification Search
CPC .... H04W 48/08; H04W 24/10; H04L 5/0053; H04L 5/005; H04L 5/0007
See application file for complete search history.

(56) References Cited

U.S. PATENT DOCUMENTS

| | | | |
|---|---|---|---|
| 11,570,784 B2 * | 1/2023 | Kim | H04L 5/0048 |
| 2021/0044471 A1 | 2/2021 | Zhou et al. | |
| 2023/0262761 A1 * | 8/2023 | Sun | H04L 5/0048 370/329 |
| 2023/0345397 A1 | 10/2023 | Lei | |

OTHER PUBLICATIONS

Dahlman E., et al., "LTE/NR Interworking and Coexistence", 5G NR The Next Generation Wireless Access Technology, 2nd Edition, Chapters 18-27, Sep. 18, 2020, Elsevier, XP055908003, pp. 371-583, p. 475, figure 23.15.
International Search Report and Written Opinion—PCT/US2024/021332—ISA/EPO—Aug. 12, 2024.

* cited by examiner

*Primary Examiner* — Chuong A Ngo
(74) *Attorney, Agent, or Firm* — Loza & Loza, LLP

(57) ABSTRACT

A network entity configures a synchronization signal block (SSB) using SSB resources that convey a primary synchronization signal (PSS), a secondary synchronization signal (SSS), and a physical broadcast channel (PBCH) within an SSB resource area of a resource grid bounded in time by a first configured integer number of time units and bounded in frequency by a second configured integer number of physical channels. A product of the first configured integer number and the second configured integer number is a predetermined constant value, each symbol of the SSB has an equal number of resource elements (REs), and all REs in the each symbol of the SSB, except REs within a frequency guard band between any two of the PSS, the SSS, and the PBCH in the each symbol of the SSB, have non-zero values. A user equipment receives the SSB in the SSB resources as a beamformed SSB.

30 Claims, 20 Drawing Sheets

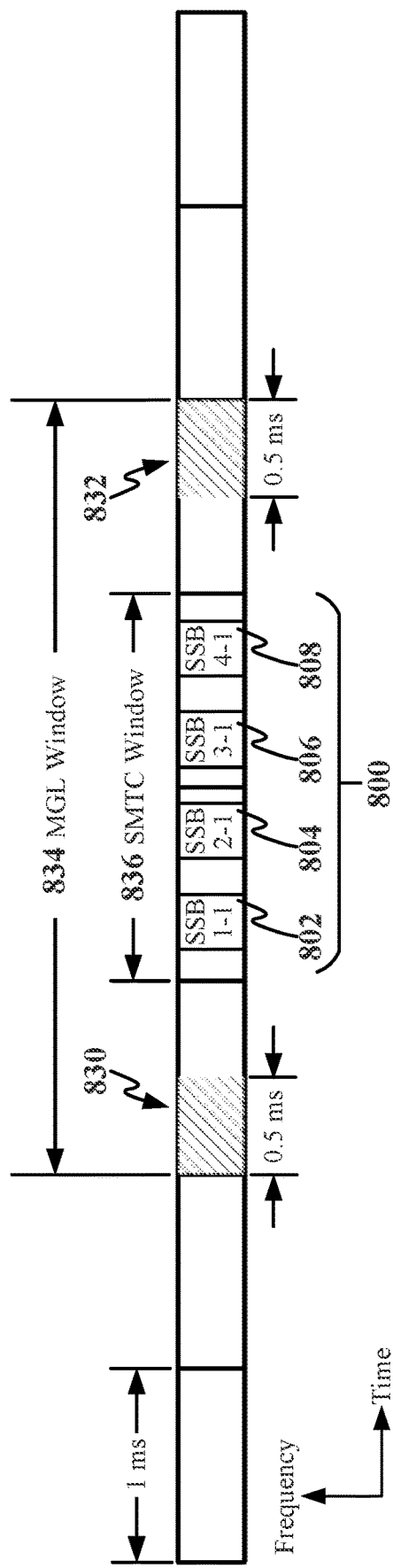
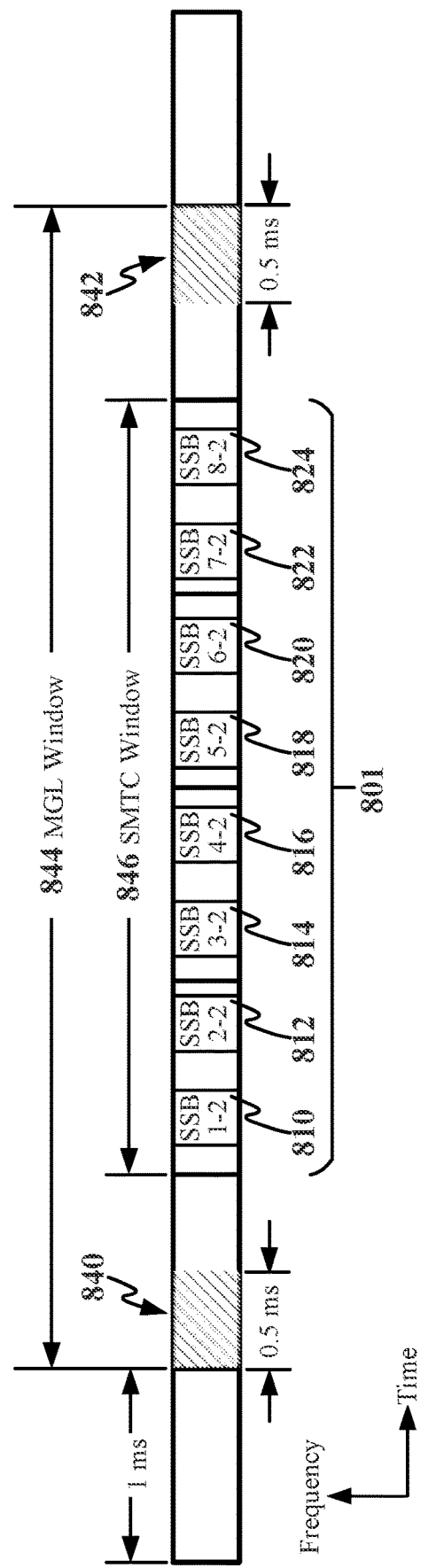
FIG. 8A
FIG. 8B

PRIMARY SYNCHRONIZATION SIGNAL DESIGN

TECHNICAL FIELD

This disclosure relates generally to wireless communication, and more specifically, to primary synchronization signal design.

INTRODUCTION

Synchronization signal blocks (SSBs) transmitted in SSB burst sets may be used in connection with channel measurements and handover decisions. In some examples, a wireless communication device may need to temporarily cease communication with its serving cell to tune its receiver to a frequency used by a neighbor cell or neighbor transmit and receive point to receive and measure that neighbor's SSBs. A time during which a UE cannot communicate with its serving cell in such an example is referred to as a measurement gap length. A configuration of SSB resources that results in an inefficient use of time-frequency resources in general and an unnecessarily lengthy measurement gap length is undesirable.

BRIEF SUMMARY OF SOME EXAMPLES

The systems, methods, and devices of this disclosure each have several innovative aspects, no single one of which is solely responsible for the desirable attributes disclosed herein.

In one example, a method, at a network entity, is described. The method includes configuring a synchronization signal block (SSB) using SSB resources that convey a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels. According to one aspect, a product of the first configured integer number and the second configured integer number is a predetermined constant value, each symbol of the SSB has an equal number of resource elements (REs), and all REs in the each symbol of the SSB, except REs within a first frequency guard band between any two of the PSS, the SSS, and the PBCH in the each symbol of the SSB, have non-zero values. The method also includes transmitting the SSB in the SSB resources as a beamformed SSB.

In one example, a network entity is described. The network entity includes one or more memories and one or more processors. The one or more processors are configured to, individually or collectively, based at least in part on information stored in the one or more memories, configure a synchronization signal block (SSB) using SSB resources that convey a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels. In some aspects, a product of the first configured integer number and the second configured integer number is a predetermined constant value, each symbol of the SSB has an equal number of resource elements (REs), and all REs in the each symbol of the SSB, except REs within a first frequency guard band between any two of the PSS, the SSS, and the PBCH in the each symbol of the SSB, have non-zero values. The one or more processors are also configured to, individually or collectively, based at least in part on information stored in the one or more memories, transmit the SSB in the SSB resources as a beamformed SSB.

In one example, a method, at a user equipment is described. According to the example, the method includes receiving, from a network entity, a synchronization signal block (SSB) conveying a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels. In some aspects, a product of the first configured integer number and the second configured integer number is a predetermined constant value, each symbol of the SSB has an equal number of resource elements (REs), and all REs in the each symbol of the SSB, except REs within a first frequency guard band between any two of the PSS, the SSS, and the PBCH in the each symbol of the SSB, have non-zero values. The method further includes transmitting, to the network entity, at least one of: a layer 1 (L1) measurement report, or a layer 3 (L3) measurement report based on measurements of SSB reference signals (SSB-RSs) within the SSB resource area.

In another example, a user equipment is described. In the example, the user equipment includes one or more memories and one or more processors. According to some aspects, the one or more processors are configured to, individually or collectively, based at least in part on information stored in the one or memories, receive from a network entity, a synchronization signal block (SSB) conveying a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels. According to some aspects, a product of the first configured integer number and the second configured integer number is a predetermined constant value, each symbol of the SSB has an equal number of resource elements (REs), and all REs in the each symbol of the SSB, except REs within a first frequency guard band between any two of the PSS, the SSS, and the PBCH in the each symbol of the SSB, have non-zero values. According to some aspects, the one or more processors are also configured to, individually or collectively, based at least in part on information stored in the one or memories, transmit, to the network entity, at least one of: a layer 1 (L1) measurement report, or a layer 3 (L3) measurement report based on measurements of SSB reference signals (SSB-RSs) within the SSB resource area.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 8A and 8B depict two examples of measurement gap length (MGL) windows and corresponding synchronization signal block measurement timing configuration (SMTC) windows according to some aspects of the disclosure.

Like reference numbers and designations in the various drawings indicate like elements.

DETAILED DESCRIPTION

Figure 1:
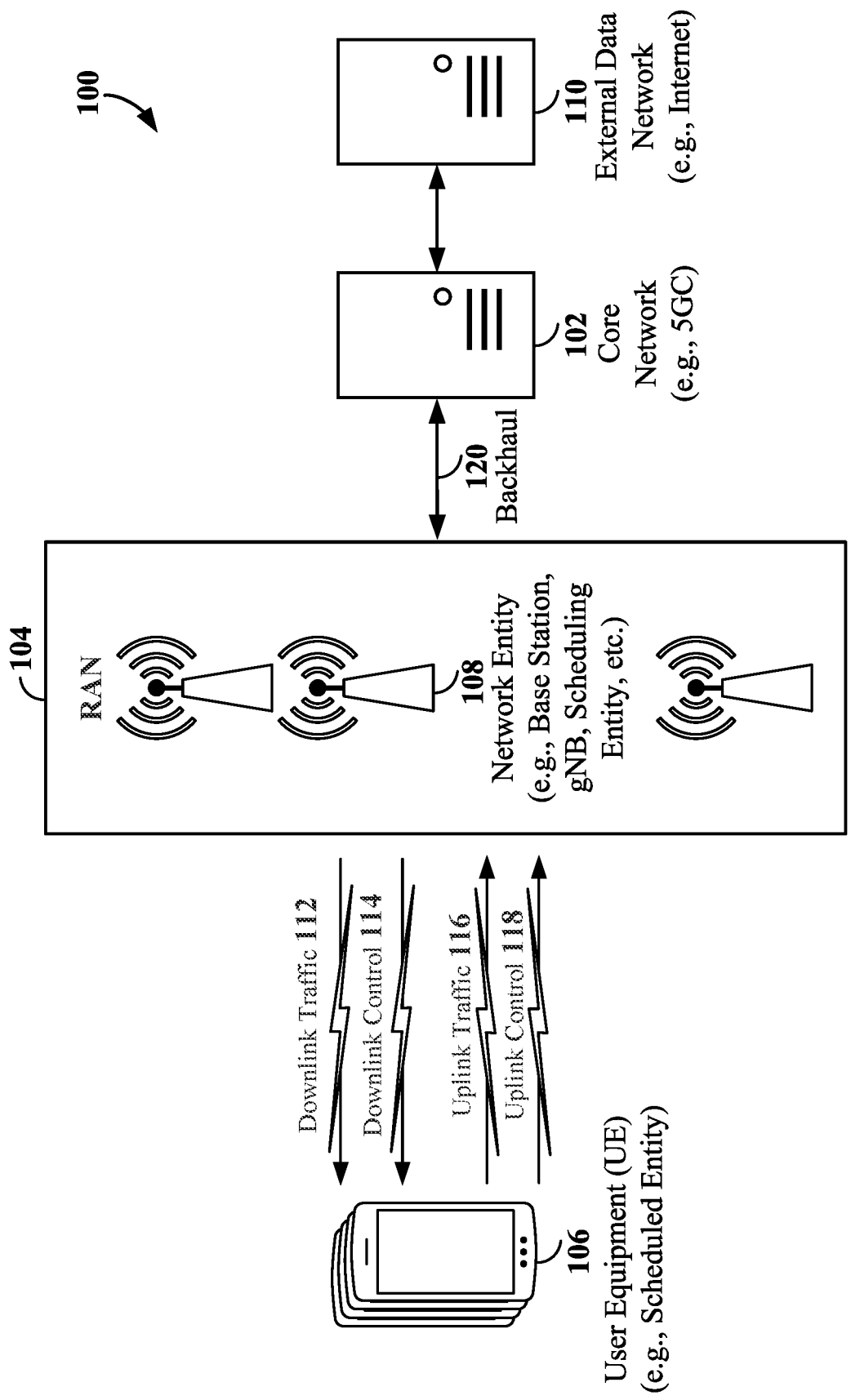
FIG. 1 is a schematic illustration of an example of a wireless communication system according to some aspects of the disclosure.

The detailed description set forth below in connection with the appended drawings is directed to some particular examples for the purpose of describing innovative aspects of this disclosure. However, a person having ordinary skill in the art will readily recognize that the teachings herein can be applied in a multitude of different ways. Some or all of the described examples may be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system, or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to persons having ordinary skill in the art that these concepts may be practiced without these specific details. In some examples, well-known structures and components are shown in block diagram form in order to avoid obscuring such concepts.

While aspects and examples are described in this application by illustration to some examples, persons having ordinary skill in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or user equipment (UE)), end-user devices, etc. of varying sizes, shapes, and constitution.

Described herein are techniques associated with a configuration of a synchronization signal block (SSB). The SSB includes SSB resources that convey a primary synchronization signal (PSS), a secondary synchronization signal (SSS), and a physical broadcast channel (PBCH). The SSB may be within an SSB resource area of a time-frequency resource grid bounded in time by a first configured integer number of time units and bounded in frequency by a second configured integer number of physical channels according to some aspects of the disclosure. According to some aspect of the disclosure, a product of the first configured integer number and the second configured integer number is a predetermined constant value, each symbol of the SSB has an equal number of resource elements (REs), and all REs in the each symbol of the SSB, except REs within a first frequency guard band between any two of the PSS, the SSS, and the PBCH in the each symbol of the SSB, have non-zero values. Aspects of PSS sequence generation are described according to some aspects of the disclosure.

The various concepts presented throughout this disclosure may be implemented across a broad variety of telecommunication systems, network architectures, and communication standards. Referring now to FIG. 1, as an illustrative example without limitation, a schematic illustration of an example of a wireless communication system 100 according to some aspects of the disclosure is presented. The wireless communication system 100 includes three interacting domains: a core network 102, a radio access network (RAN) 104, and a user equipment (UE) 106. By virtue of the wireless communication system 100, the UE 106 (also referred to herein as a wireless communication device) may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of network entities 108. Broadly, a network entity may be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In some examples, a network entity may be a network element in a radio access network responsible for radio transmission and reception in one or more cells to or from a UE. In different technologies, standards, or contexts, a network entity may variously be referred to by persons having ordinary skill in the art as a base transceiver station (BTS), a radio base station, a base station, a radio transceiver, a transceiver function, a basic service set (BSS), an extended service set (ESS), an access point (AP), a Node B (NB), an eNode B (eNB), a gNode B (gNB), a transmission and reception point (TRP), a scheduling entity, a network entity, or some other suitable terminology. In some examples, a network entity may include two or more TRPs that may be collocated or non-collocated. Each TRP may communicate on the same or different carrier frequency within the same or different frequency band. In examples where the RAN 104 operates according to both the LTE and 5G NR standards, one of the network entities may be an LTE network entity, while another network entity may be a 5G NR network entity.

The RAN 104 is further illustrated supporting wireless communication for multiple mobile apparatuses. A mobile apparatus may be referred to as user equipment (UE) in 3GPP standards, but may also be referred to by persons having ordinary skill in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, a scheduled entity, or some other suitable terminology. A UE 106 may be an apparatus (e.g., a mobile apparatus, a wireless communication device) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smartphone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smartwatch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data and/or relevant QoS for transport of critical service data.

Wireless communication between the RAN 104 and the UE 106 may be described as utilizing an air interface. Transmissions over the air interface from a network entity (e.g., similar to network entity 108) to one or more UEs (e.g., similar to UE 106) may be referred to as downlink (DL) transmission. In accordance with certain aspects of the present disclosure, the term downlink may refer to a point-to-multipoint transmission or a point-to-point transmission (e.g., groupcast, multicast, or unicast) originating at a network entity (e.g., network entity 108). Another way to describe this scheme may be to use the term broadcast channel multiplexing. Transmissions from a UE (e.g., UE 106) to a network entity (e.g., network entity 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, where a network entity (e.g., a network entity 108) allocates resources for communication among some or all devices and equipment within its service area or cell. Within the present disclosure, as discussed further below, the network entity (e.g., network entity 108) may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the network entity 108.

Network entities 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, the network entity 108 may broadcast downlink traffic 112 (also referred to as downlink data traffic) to one or more UEs 106. Broadly, the network entity 108 may be a node or device responsible for scheduling traffic (e.g., data traffic, user data traffic) in a wireless communication network, including the downlink traffic 112 and, in some examples, uplink traffic 116 (also referred to as uplink data traffic) from one or more UEs 106 to the network entity 108. On the other hand, the UE 106 (e.g., the scheduled entity) may be a node or device that receives downlink control 114 information, including but not limited to scheduling information (e.g., a grant), synchronization or timing information, or other control information from another entity in the wireless communication network such as the network entity 108. The UE 106 may further transmit uplink control 118 information, including but not limited to a scheduling request or feedback information, or other control information to the network entity 108.

In addition, the uplink control 118 information and/or downlink control 114 information and/or uplink traffic 116 and/or downlink traffic 112 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, the network entity 108 may include a backhaul interface (not shown) for communication with a backhaul portion 120 of the wireless communication system 100. The backhaul portion 120 may provide a link between a network entity 108 and the core network 102. Further, in some examples, a backhaul network may provide interconnection between respective network entities 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5G core (5GC)). In other examples, the core network 102 may be configured according to a 4G evolved packet core (EPC) or any other suitable standard or configuration.

Figure 2:
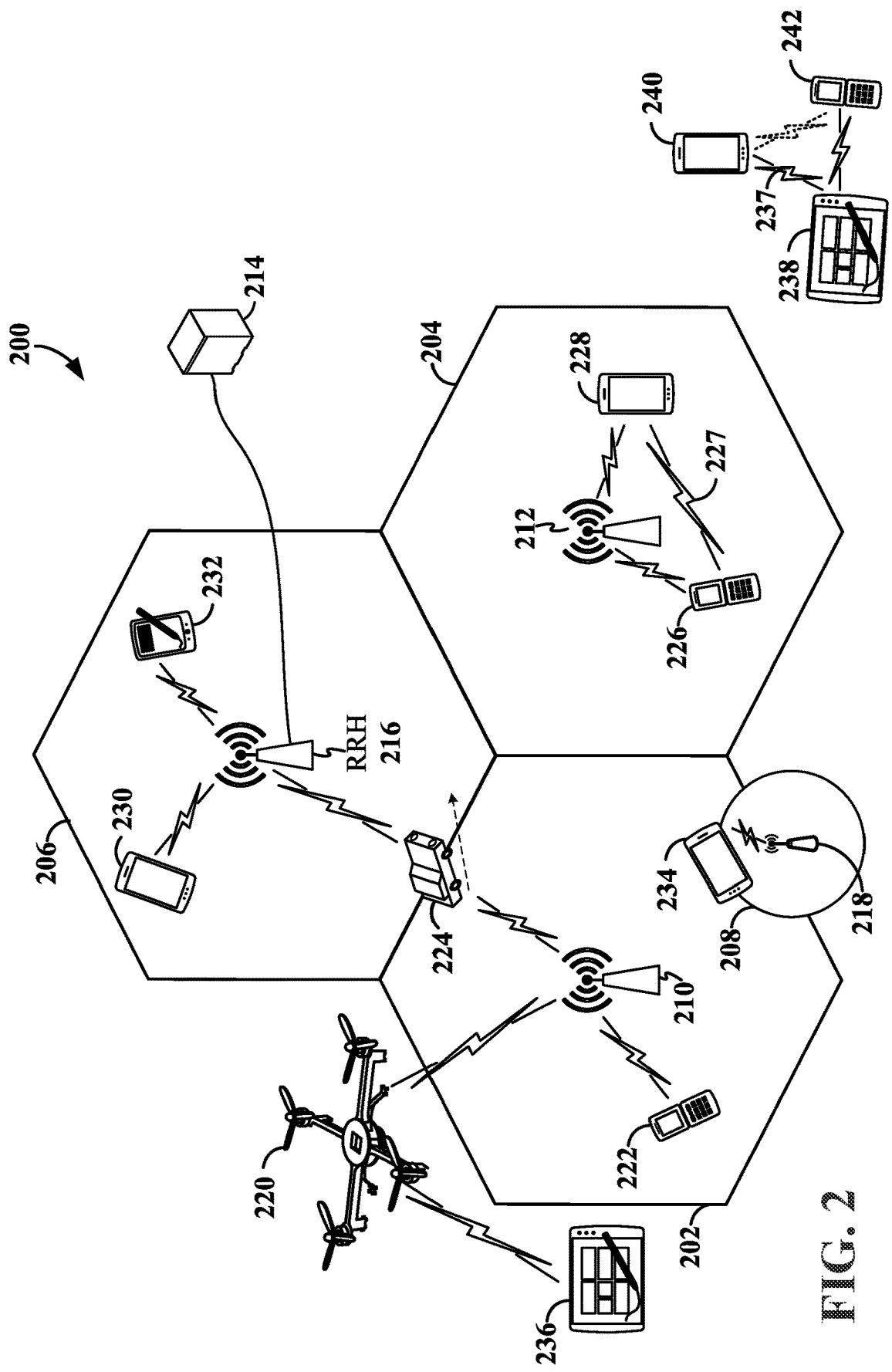
FIG. 2 is a schematic illustration of an example of a radio access network according to some aspects of the disclosure.

Referring now to FIG. 2, as an illustrative example without limitation, a schematic illustration of an example of a radio access network (RAN) 200 according to some aspects of the disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or network entity. FIG. 2 illustrates cells 202, 204, 206, and 208, each of which may include one or more sectors (not shown). A sector is a sub-area of a cell. All sectors within one cell are served by the same network entity. A radio link within a sector can be identified by a single logical identification belonging to that sector. In a cell that is divided into sectors, the multiple sectors within a cell can be formed by groups of antennas, with each antenna responsible for communication with UEs in a portion of the cell.

Various network entity arrangements can be utilized. For example, in FIG. 2, two network entities, referred to as base station 210 and base station 212, are shown in cells 202 and 204. A third network entity, referred to as base station 214, is shown controlling a remote radio head (RRH) 216 in cell 206. That is, a network entity can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of network entities (e.g., base stations, gNBs, TRPs, scheduling entities) and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the network entity 108 described above and illustrated in FIG. 1.

FIG. 2 further includes an unmanned aerial vehicle (UAV) 220, which may be a drone, quadcopter, octocopter, etc. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, UE 234 may be in communication with base station 218, and UE 236 may be in communication with mobile base station 220. In some examples, the UEs 222, 224, 226, 228, 230, 232, 234, 236, 238, 240, and/or 242 may be the same as or similar to the one or more UEs 106 described above and illustrated in FIG. 1. In some examples, the UAV 220 may be a mobile network entity and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station (e.g., a network entity). In other examples, two or more UEs (e.g., UEs 226 and 228) within the coverage area of a network entity (e.g., base station 212) may also communicate sidelink signals 227 over a direct link (sidelink) without conveying that communication through the network entity (e.g., base station 212). In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of network entities and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a network entity (e.g., an aggregated or disaggregated base station, gNB, eNB, TRP, scheduling entity, etc.), or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell (e.g., cell 202) to the geographic area corresponding to a neighbor cell (e.g., cell 206). When the signal strength or quality from the neighbor cell exceeds that of its serving cell for a given amount of time, the UE 224 may transmit a reporting message to its serving network entity (e.g., base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, where technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into the mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different subbands of the carrier bandwidth. This type of full-duplex communication may be referred to herein as subband full-duplex (SBFD), also known as flexible duplex.

Deployment of communication systems, such as 5G new radio (NR) systems, may be arranged in multiple manners with various components or constituent parts. In a 5G NR system, or network, a network entity, a network entity, a mobility element of a network, a radio access network (RAN) node, a core network entity, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
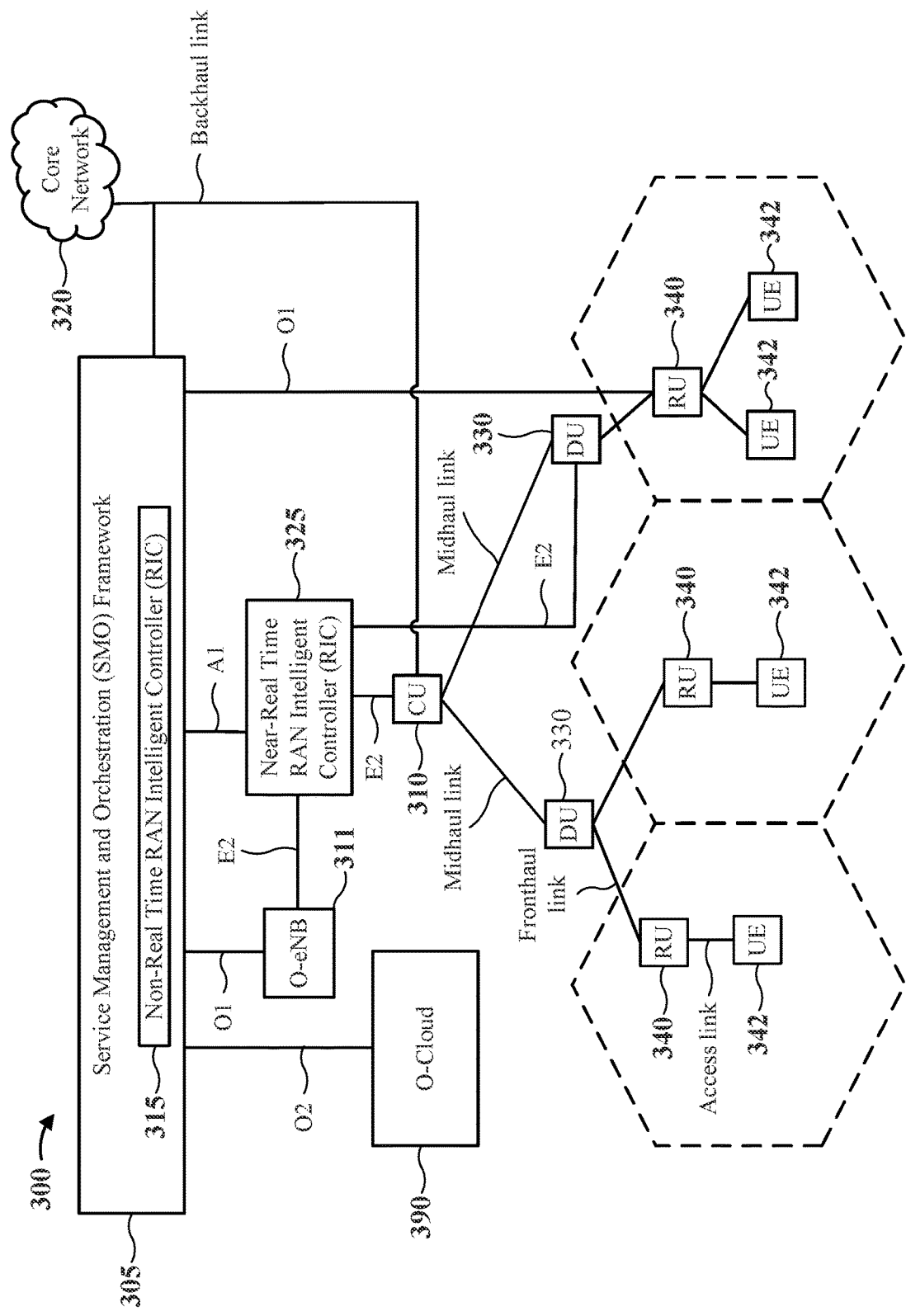
FIG. 3 is a schematic illustration of an example of a disaggregated base station architecture according to some aspects of the disclosure.

FIG. 3 is a schematic illustration of an example disaggregated base station 300 architecture according to some aspects of the disclosure. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 342 via one or more radio frequency (RF) access links. In some implementations, the UE 342 may be simultaneously served by multiple RUs 340. UE 342 may be the same or similar to any of the UEs or scheduled entities illustrated and described in connection with FIG. 1 and FIG. 2, for example.

Each of the units, i.e., the CUs 310, the DUs 330, the RUs 340, as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation, and demodulation, or the like) depending, at least in part, on a functional split, such as those defined by the $3^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 342. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 3G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Various aspects of the present disclosure will be described with reference to an OFDM waveform, schematically illustrated in FIG. 4. It should be understood by persons having ordinary skill in the art that the various aspects of the present disclosure may be applied to an SC-FDMA waveform in substantially the same way as described hereinbelow. That is, while some examples of the present disclosure may focus on an OFDM link for clarity, it should be understood that the same principles may be applied as well to SC-FDMA waveforms.

Figure 4:
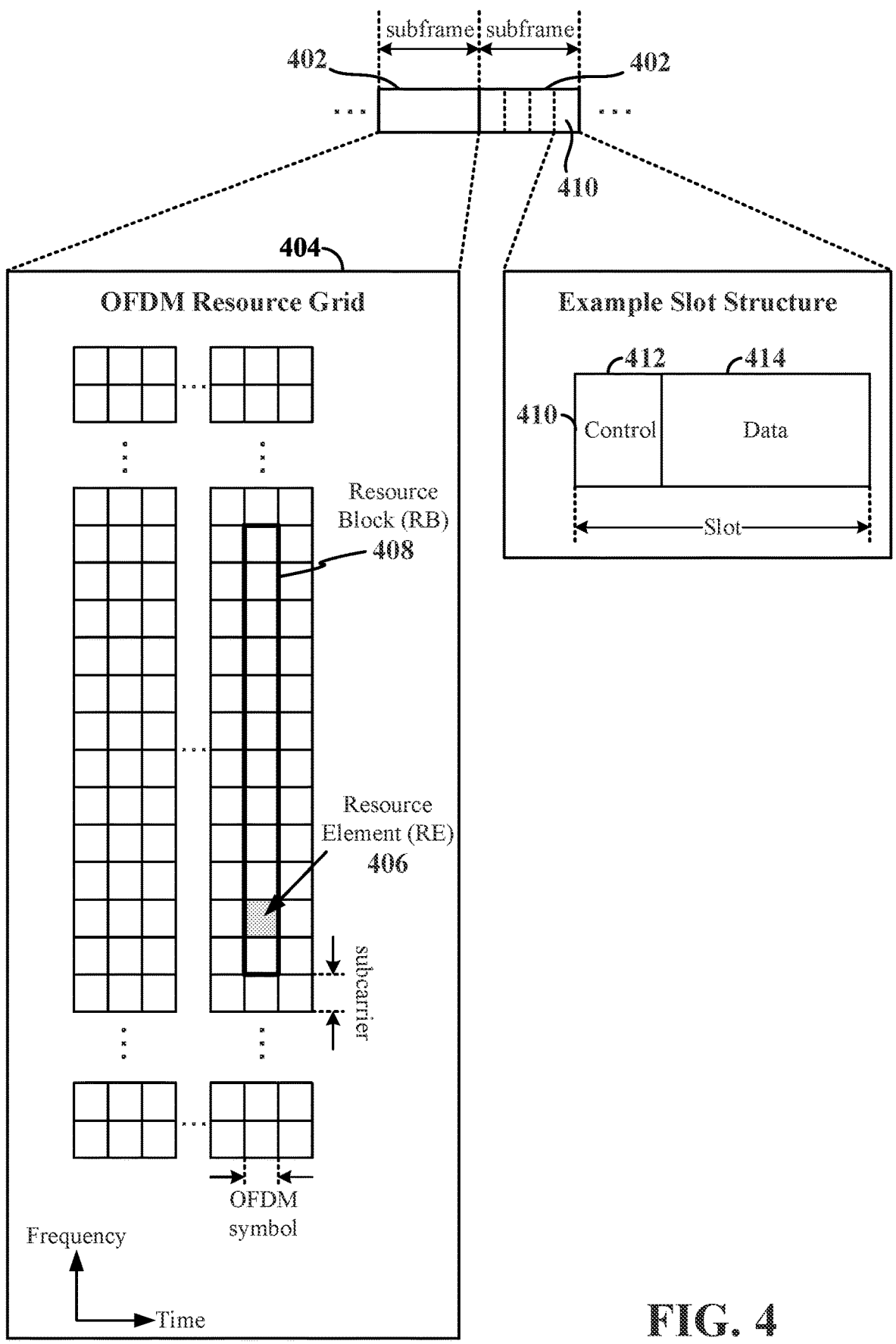
FIG. 4 is an expanded view of an exemplary subframe, showing an orthogonal frequency division multiplexing (OFDM) resource grid according to some aspects of the disclosure.

Referring now to FIG. 4, an expanded view of an exemplary subframe 402 is illustrated, showing an OFDM resource grid. However, persons having ordinary skill in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain.

A set of continuous or discontinuous resource blocks may be referred to herein as a Resource Block Group (RBG), subband, or bandwidth part (BWP). A set of subbands or BWPs may span the entire bandwidth. Scheduling of wireless communication devices (e.g., V2X devices, sidelink devices, or other UEs, hereinafter generally referred to as UEs) for downlink, uplink, or sidelink transmissions may involve scheduling one or more resource elements 406 within one or more subbands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a network entity (e.g., an aggregated or disaggregated base station, gNB, eNB, TRP, scheduling entity, etc.) or may be self-scheduled by a UE/sidelink device implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. An additional example may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of slot 410 illustrates that the slot 410 includes a control region 412 and a data region 414. In general, the control region 412 may carry control channels, and the data region 414 may carry data channels. In some examples, a Uu slot (e.g., slot 410) may contain all DL, all UL, or at least one DL portion and at least one UL portion. The structures illustrated in FIG. 4 are merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a network entity, UE, or other similar device) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the network entity may allocate one or more REs 406 (e.g., within the control region 412) of the slot 410 to carry DL control information including one or more DL control channels, such as a physical downlink control channel (PDCCH), to one or more UEs (e.g., scheduled entities). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to persons having ordinary skill in the art, where the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The network entity may further allocate one or more REs 406 (e.g., in the control region 412 or the data region 414) of the Uu slot 410 to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 4, 10, 20, 50, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A network entity may transmit other system information (OSI) as well.

In an UL transmission, the UE (e.g., scheduled entity) may utilize one or more REs 406 of the Uu slot 410 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, a measurement report (e.g., a Layer 1 (L1) measurement report), or any other suitable UCI.

In addition to control information, one or more REs 406 (e.g., within the data region 414) of the Uu slot 410 may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, sidelink MAC-CEs may be transmitted in the data region 414 of the slot 410. In addition, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number (e.g., a quantity) of bits of information, may be a controlled parameter based on the modulation and coding scheme (MCS) and the number of RBs in a given transmission.

The channels or carriers described above in connection with FIGS. 1-4 are not necessarily all of the channels or carriers that may be utilized between devices, and persons of ordinary skill in the art will recognize that other channels or carriers may be utilized in addition to those illustrated, such as other traffic, control, and feedback channels.

Figure 5:
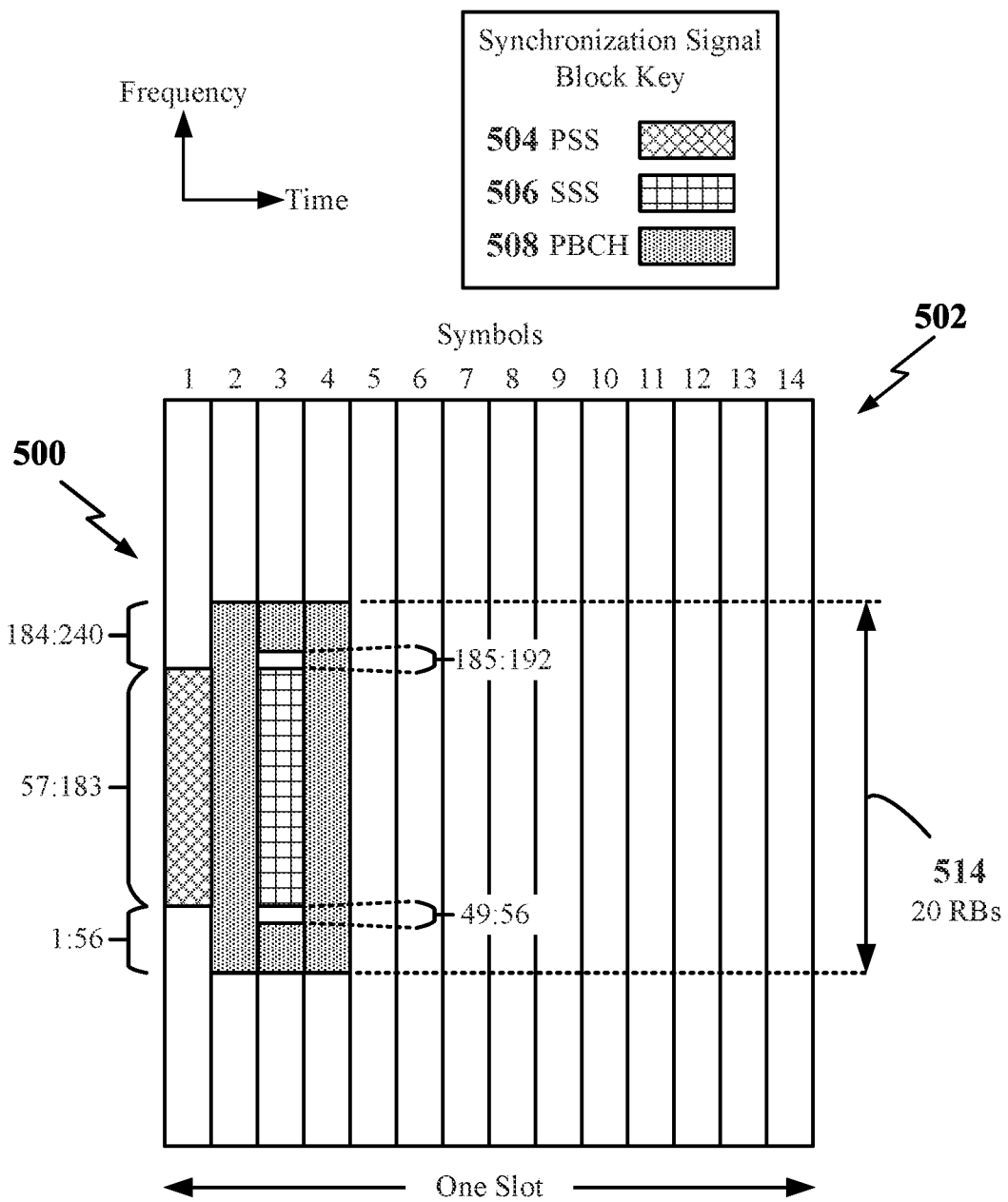
FIG. 5 is an illustration of a portion of an OFDM resource grid depicting a resource mapping of a synchronization signal block in one slot as used with a Uu reference point in 5G NR.

FIG. 5 is an illustration of a portion of an OFDM resource grid depicting a resource mapping of a synchronization signal block (SSB) 500 in one slot 502 as used with a Uu reference point in 5G NR. The one slot 502 includes 14 symbols. The SSB 500 may be mapped to 4 consecutive symbols in the time domain and 240 subcarriers (i.e., 20 RBs) in the frequency domain. In one example, in a case where the 14 symbols of the slot are indexed as {0, 1, 2, . . . 13}, the first symbol of a SSB block (i.e., PSS) may occur at {2, 8} or {2, 9} or {4, 8}. As shown in the example of FIG. 5, a primary synchronization signal (PSS) 504 is transmitted in the first symbol (of the 4 consecutive symbols), and a secondary synchronization signal (SSS) 506 is transmitted in the third symbol (of the 4 consecutive symbols). A physical broadcast channel (PBCH) 508 is transmitted in the second and fourth symbols (of the 4 consecutive symbols) as well as in the third symbol, bracketing the SSS 506 in the frequency domain.

The PSS 504 is time division multiplexed (TDMd) with the SSS 506 and the PBCH 508 within the SSB 500. The PSS 504 in the first symbol is mapped to 127 consecutive REs (in 127 consecutive subcarriers) in the frequency domain (subcarriers 57 through 183). The REs of the subcarriers below (subcarriers 1 through 56) and above (subcarriers 184 through 240) the PSS 504 may have zero values (or null values). As used herein, below may mean a frequency having a value less than (e.g., lower than) a given frequency (i.e., the frequency being compared), and above may mean a frequency having a value that is greater than (e.g., higher than) the given frequency. The SSS 506 in the third symbol is mapped to the same subcarriers (subcarriers 57 through 183) as the PSS 504. Guard bands of 8 subcarriers bracket the SSS 506 below (subbands 49 through 56) and above (subcarriers 185 through 192) the subcarriers of the SSS 506 (i.e., the REs in the guard bands have zero values). The PBCH 508 occupies 576 REs in total; 240 REs in the second symbol, 240 REs in the fourth symbol, and 96 REs (i.e., the first 48 (subcarriers 1 through 48) and the last 48 (subcarriers 193 through 240)) in the third symbol. The 576 REs of the PBCH 508 include REs used for the PBCH and for the demodulation reference signals (DMRS) (not shown) needed for coherent demodulation of the PBCH 508.

Figure 6:
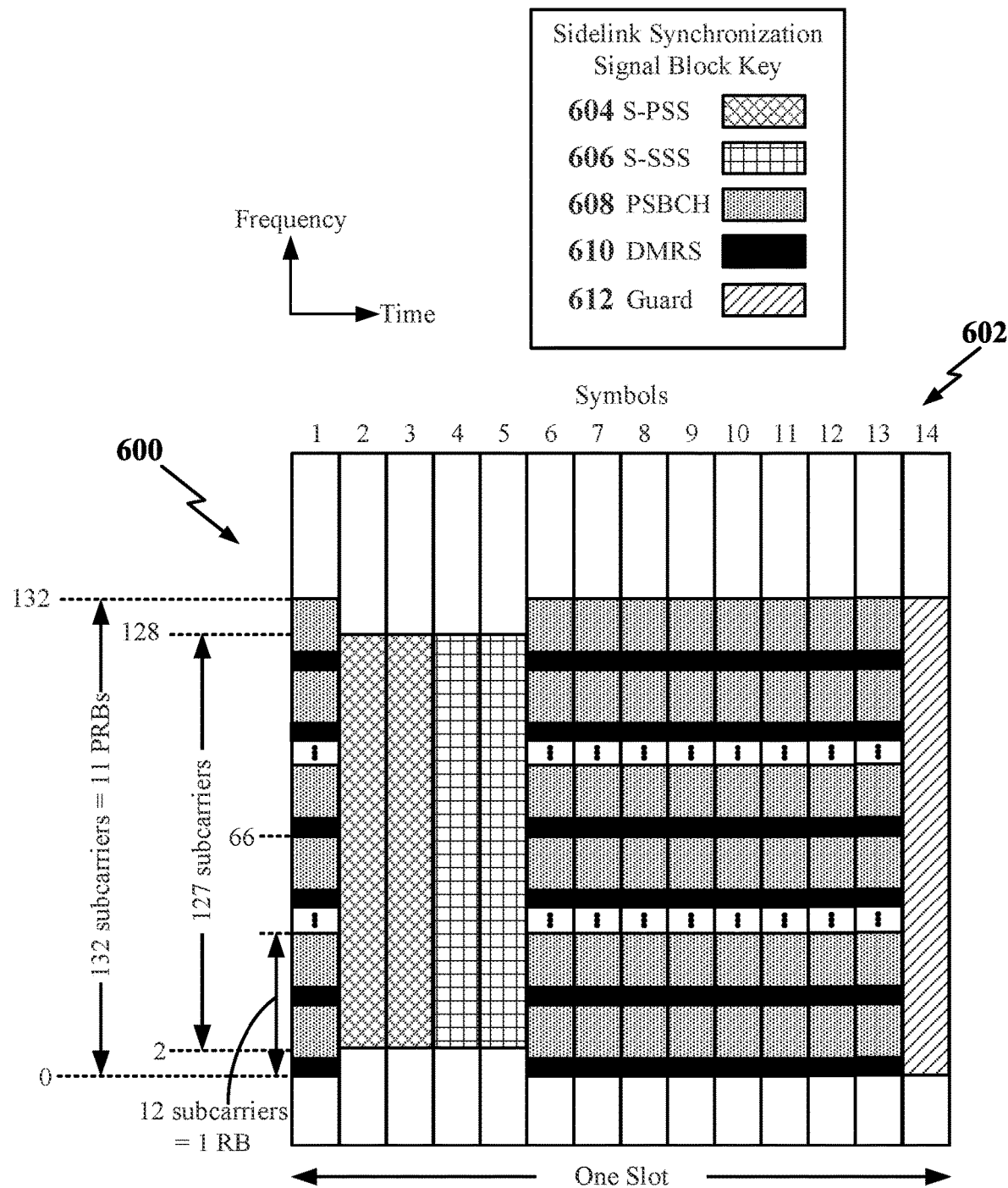
FIG. 6 is an illustration of a portion of an OFDM resource grid depicting a resource mapping of a sidelink synchronization signal block in one slot as used with a PC5 reference point in 5G NR.

FIG. 6 is an illustration of a portion of an OFDM resource grid depicting a resource mapping of a sidelink synchronization signal block 600 (S-SSB 600) in one slot 602 as used with a PC5 reference point in 5G NR. In the example of FIG. 6, on sidelink, the S-SSB 600 is transmitted by a synchronization reference (SynchRef) sidelink UE based on 160 ms periodicity. The resource mapping for S-SSB 600 via a PC5 reference point (e.g., a PC5 link) is different from the resource mapping for SSB 500 (FIG. 5) via a Uu reference point (e.g., a Uu link).

In the S-SSB 600, the sidelink-primary synchronization signal 604 (S-PSS 604) is obtained using a 127 M-sequence and a same generator and/or initial value as used with the Uu PSS 504 with cyclic shifts (CSs) given by the set {22, 65}. The S-PSS 604 is mapped to 127 consecutive REs and repeated on 2 consecutive OFDM symbols.

In the S-SSB 600, the sidelink-secondary synchronization signal 606 (S-SSS 606) is obtained using a 127 Gold sequence and a same generator and/or initial value and cyclic shifts as used with the Uu SSS 506 (FIG. 5). The S-SSS 606 is mapped to 127 consecutive REs and repeated on 2 consecutive OFDM symbols.

In the S-SSB 600, the physical sidelink broadcast channel (PSBCH) 608 is mapped to 11 consecutive PRBs (132 subcarriers) and 9 OFDM symbols (see symbols 1 and 6 through 13) for nominal cyclic prefix (NCP). The PSBCH 608 is mapped to 11 consecutive PRBs and 6 OFDM symbols (not shown) for extended cyclic prefix (ECP). In the S-SSB 600, the first PSBCH symbol (see symbol 1) may be used for automatic gain control (AGC) training at a receiver (Rx) side of a UE.

Figure 7:
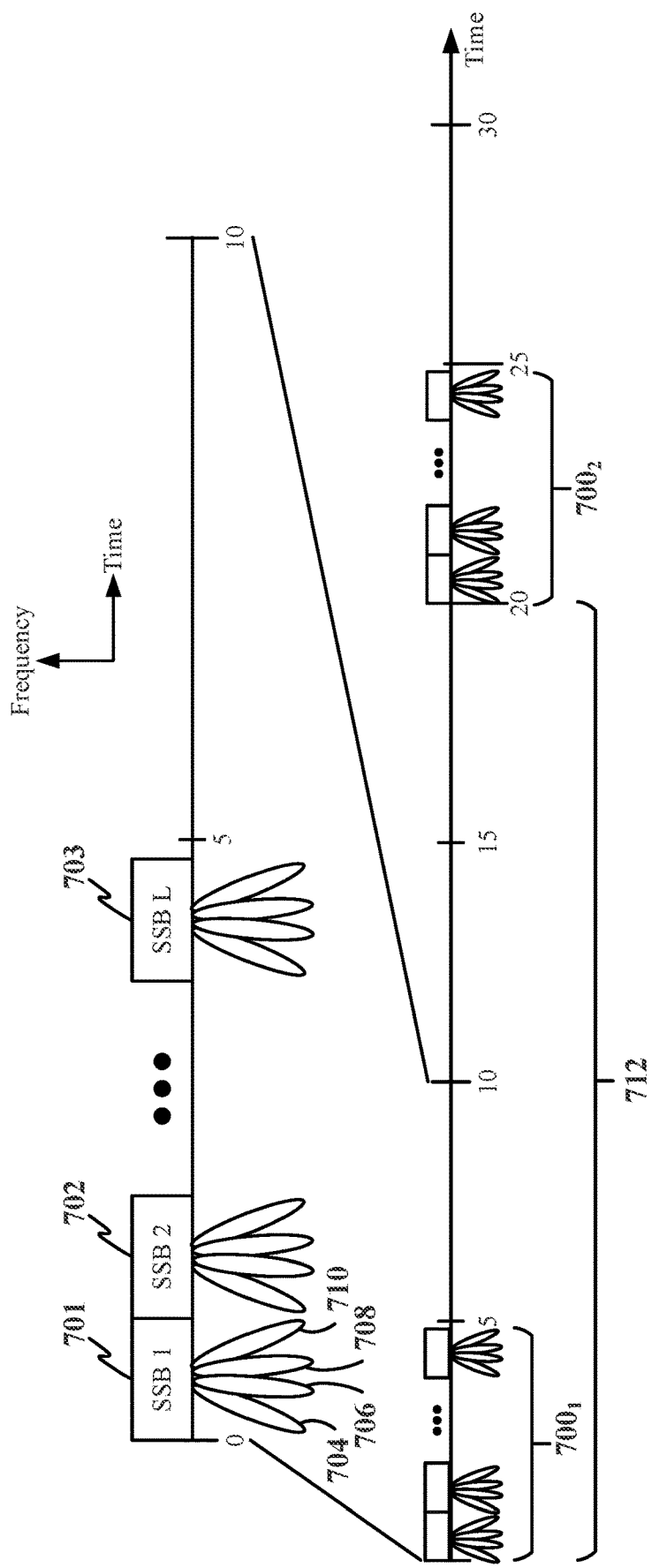
FIG. 7 is a diagram illustrating an example of a periodic repetition of a synchronization signal block burst set according to some aspects of the disclosure.

FIG. 7 is a diagram illustrating an example of a periodic repetition of a synchronization signal block burst set 700 (SSB burst set 700) according to some aspects of the disclosure. In FIG. 7, the SSB burst set 700 includes a plurality of SSBs; however, an SSB burst set may include one or more SSBs. Multiple SSBs may be scheduled in a given cell. On a Uu link (i.e., between a base station and a UE), the multiple SSBs and SSB beams (i.e., antenna beams) may be time division multiplexed and grouped together within the SSB burst set 700. By way of example and not limitation, in FIG. 7, each of the first SSB 701 (SSB 1) and the second SSB 702 (SSB2) through $L^{th}$ SSB 703 (SSB L) is depicted with four beams (a first beam 704, a second beam 706, a third beam 708, and a fourth beam 710) from a scheduling entity's antenna. The quantity of 4 antenna beams was selected for ease of illustration and not limitation. Less than 4 antenna beams and greater than 4 antenna beams are within the scope of the disclosure.

The quantity L represents the maximum number of SSBs in the SSB burst set 700. According to some aspects, L depends on the carrier frequency and numerology utilized by the base station and UE. In general, L may be equal to 4, 8, or 64. For example, where the carrier frequency, f, is less than or equal to 3 GHz (f≤3 GHz) and the sub-carrier spacing is 15 kHz or 30 kHz, the maximum number, L, of SSBs in an SSB burst set may be 4. For example, where the carrier frequency, f, is greater than 3 GHz and less than or equal to 6 GHz (3 GHz<f≤6 GHz) and the sub-carrier spacing is 15 kHz or 30 kHz, the maximum number, L, of SSBs in an SSB burst set may be 8. For example, where the carrier frequency, f, is greater than 6 GHz (f>6 GHz) and the sub-carrier spacing is 120 kHz or 240 kHz, the maximum number, L, of SSBs in an SSB burst set may be 64. Accordingly, as the frequency increases and beam widths narrow, more steps of beam sweeping may occur, and more SSBs may be necessary.

As depicted in the example of FIG. 7, an SSB burst set 700 may be a collection of one or more SSBs broadcast in a given cell. The SSB burst set 700 may be broadcast within a 5 ms window within a first or second half of a given frame (e.g., frame 714). A maximum number, L, of SSBs may be included in the SSB burst set 700, where L is frequency and numerology (sub-carrier spacing) dependent.

Additionally, an SSB index value (e.g., 0, 1, . . . , L–1) may be encoded in the PBCH DMRS in a PBCH of each given SSB 701, 702, . . . , 703. SSBs with the same index (in different SSB burst sets, such as SSB burst set $700_1$ and SSB burst set $700_2$) may be used for a same purpose (e.g., used to designate or be associated with an antenna beam directed in one direction). Additionally, SSBs with the same index (in different SSB burst sets) may be transmitted on quasi-colocated antenna ports, where the same gain and beamforming applies to each of the quasi-colocated antenna ports, and where delay spread, Doppler spread, Doppler shift, average gain, average delay, and spatial parameters are identical or substantially identical.

The SSB burst set 700 may be periodically repeated and broadcast by the base station with a given periodicity. For example, FIG. 7 depicts a first broadcast of the SSB burst set $700_1$ and a repeated broadcast of the SSB burst set $700_2$. The number of repetitions may be greater than one. In FIG. 7, only the first broadcast of the SSB burst set $700_1$ and the repeated broadcast of the SSB burst set $700_2$ are shown to avoid cluttering the drawing. The repetitions of the SSB burst sets may be used, for example, for re-transmissions, beam sweeping, or both.

According to some aspects, the periodicity of the SSB burst sets may be set by an operator at 5, 10, 20, 40, 80, or 160 milliseconds (ms), the entirety of the SSB burst set 700 occurs within a 5 ms duration (e.g., a window in the time domain), and the 5 ms duration may occur in the first or second half of a 10 ms frame. In the example of FIG. 7, a first frame 712, and a first half of a second frame are illustrated to avoid cluttering the drawing. In the example of FIG. 7, the periodicity of the SSB burst set 700 is 20 ms, and the SSB burst set 700 is broadcast within the 5 ms duration in the first half of a respective 10 ms frame. Using the given periodicity (i.e., 20 ms in FIG. 7), a group (e.g., a set, a plurality) of SSBs may be transmitted in different directions using different beams (e.g., the first beam 704, the second beam 706, the third beam 708, and the fourth beam 710).

For SSB and S-SSB design in 5G NR, although a primary synchronization signal (PSS) is not used for link quality measurement, the duration of the PSS occupies a significant percentage (up to 25% on Uu, up to 16% on SL) of an SSB measurement window. Although a primary synchronization signal carries less information (e.g., <2 bits on Uu, 1 bit on SL) than a secondary synchronization signal, it is allocated the same amount of time and frequency resources as a secondary synchronization signal. Additionally, the primary synchronization signal is based on a cyclically-shifted M-sequence generated in the frequency domain, which is not amenable to low-complexity time domain processing prior to a fast Fourier transform (FFT).

A UE, such as any of the UEs or scheduled entities of FIGS. 1, 2, and 3, performs measurements of received signal strength in connection with, for example, a handover from one cell or TRP to another cell or TRP (both individually referred to herein as a neighbor cell). A full duplex UE can measure a received power of a transmission from a neighbor cell operating using the same radio access technology (RAT) while simultaneously transmitting and receiving at the same frequency using the same RAT with its serving cell. However, when measuring a cell operating at a different frequency (e.g., inter-frequency or intra-frequency neighbor cell) or operating using a different RAT (e.g., inter-RAT neighbor cell), the UE (with a single receiver), may need to suspend all communications (uplink and downlink) with its serving cell and re-tune its RF receiver to the frequency being used by the inter-frequency, intra-frequency, or inter-RAT neighbor cell. Once measurements are complete, the UE may resume communication with its serving cell. The time a UE suspends its communication with a serving cell is referred to herein as a measurement gap length (MGL). In 5G NR, configurable MGLs correspond to 1.5, 3, 3.5, 4, 5.5, and 6 ms. There are also configurable measurement gap repetition periods (MGRPs) corresponding to 20, 40, 80, and 160 ms. The MGRPs correspond to the periodicities of SSB burst sets described above. In 5G NR, the RF re-tuning time is 0.5 ms for carrier frequency measurements in FR1 range and 0.25 ms for FR2 range. For example, a gap length of 4 ms for FR1 measurements would allow 3 ms for actual measurements, and a gap length of 3.5 ms for FR2 measurements would allow 3 ms for actual measurements. During the measurement gaps, the UE measures SSBs of its neighbor cells (in the case of a Uu link) or S-SSBs of a SynchRef sidelink UE (in the case of a sidelink).

The network may utilize synchronization signal/physical broadcast channel block measurement timing configuration (SMTC) to configure the UE to tune to SSBs or S-SSBs within an SMTC window. The network may select the SMTC window to provide sufficient time for the UE to measure the SSBs or S-SSBs of the neighbor cells. However, if MGLs are unnecessarily long, and/or SMTC windows are unnecessarily long, then the time the UE spends tuned to the inter-frequency, intra-frequency, or inter-RAT neighbor cell is wasted. During the wasted time, the UE and its serving cell cannot communicate, which results in reduced uplink/downlink traffic throughput between the UE and its serving cell.

FIGS. 8A and 8B depict two examples of MGL windows and corresponding SMTC windows according to some aspects of the disclosure. To avoid having reduced uplink/downlink traffic throughput between the UE and its serving cell during the MGL window, the serving cell may configure the UE with appropriate MGLs and SMTCs based on the number of SSBs and the periodicity of SSB burst sets of the neighboring cells.

In FIG. 8A, first time-frequency resources corresponding to a first set of 4 SSBs (first SSB 802 (SSB 1-1), second SSB 804 (SSB 2-1), third SSB 806 (SSB 3-1), and fourth SSB 808 (SSB 4-1)) are depicted in a first SSB burst set 800. In FIG. 8B, second time-frequency resources corresponding to a second set of 8 SSBs (first SSB 810 (SSB 1-2), second SSB 812 (SSB 2-2), third SSB 814 (SSB 3-2), fourth SSB 816 (SSB 4-2), fifth SSB 818 (SSB 5-2), sixth SSB 820 (SSB 6-2), seventh SSB 822 (SSB 7-2), and eighth SSB 824 (SSB 8-2)) are depicted in a second SSB burst set 801.

In FIG. 8A, in the first time-frequency resources corresponding to the first SSB burst set 800, a first RF tuning time 830 and a second RF tuning time 832, each being 0.5 ms, are allocated at the beginning and end of the first MGL window 834. During the first RF tuning time 830 and the second RF tuning time 832, the UE cannot measure SSBs and receive or transmit data and control from or to its serving cell, respectively. In the example of FIG. 8A, the first MGL window 834 is configured as 4 ms (including the first RF tuning time 830 and the second RF tuning time 832) and the first SMTC window 836 is configured as 2 ms. The configuration may have been received at the UE from the serving cell before re-tuning. Accordingly, the UE may receive and measure the first SSB 802 (SSB 1-1), second SSB 804 (SSB 2-1), third SSB 806 (SSB 3-1), and fourth SSB 808 (SSB 4-1) within the first SMTC window 836 of 2 ms. Although not shown, the UE can take measurements during the 3 ms between the end of the first RF tuning time 830 and the start of the second RF tuning time 832.

In FIG. 8B, in the second time-frequency resources corresponding to the second SSB burst set 801, a third RF tuning time 840 and a fourth RF tuning time 842, each being 0.5 ms, are allocated at the beginning and end, respectively, of the second MGL window 844. During the third RF tuning time 840 and the fourth RF tuning time 842, the UE cannot measure SSBs and receive or transmit data and control from or to its serving cell, respectively. In the example of FIG. 8B, the second MGL window 844 is configured as 6 ms (including the third RF tuning time 840 and the fourth RF tuning time 842) and the second SMTC window 846 is configured as 4 ms. The configuration may have been received at the UE from the serving cell before re-tuning. Accordingly, the UE may receive and measure the first SSB 810 (SSB 1-2), second SSB 812 (SSB 2-2), third SSB 814 (SSB 3-2), fourth SSB 816 (SSB 4-2), fifth SSB 818 (SSB 5-2), sixth SSB 820 (SSB 6-2), seventh SSB 822 (SSB 7-2), and eighth SSB 824 (SSB 8-2) within the second SMTC window of 4 ms. Although not shown, the UE can take measurements during the 5 ms between the end of the third RF tuning time 840 and the start of the fourth RF tuning time 842.

Aspects described herein present designs for the PSS of a given SSB. The designs may facilitate a reduction in the complexity of a given UE and a reduction in the latency of the given UE in cell search and measurement operations. By way of example, the aspects described herein may reduce an interruption time and throughput loss of the given UE by reducing measurement gap lengths. In another example, the aspects described herein may improve the spectral efficiency of a network and reduce the overhead associated with measurements of several downlink reference signals (DL RSs) in BW restriction scenarios (e.g., narrow-band BWP, narrow-band sub-channels, low-tier UEs subject to BW limitations). Examples of the DL RSs include, but are not limited to, a demodulation reference signal (DMRS), a tracking reference signal (TRS), and a phase tracking reference signal (PTRS).

Figure 9:
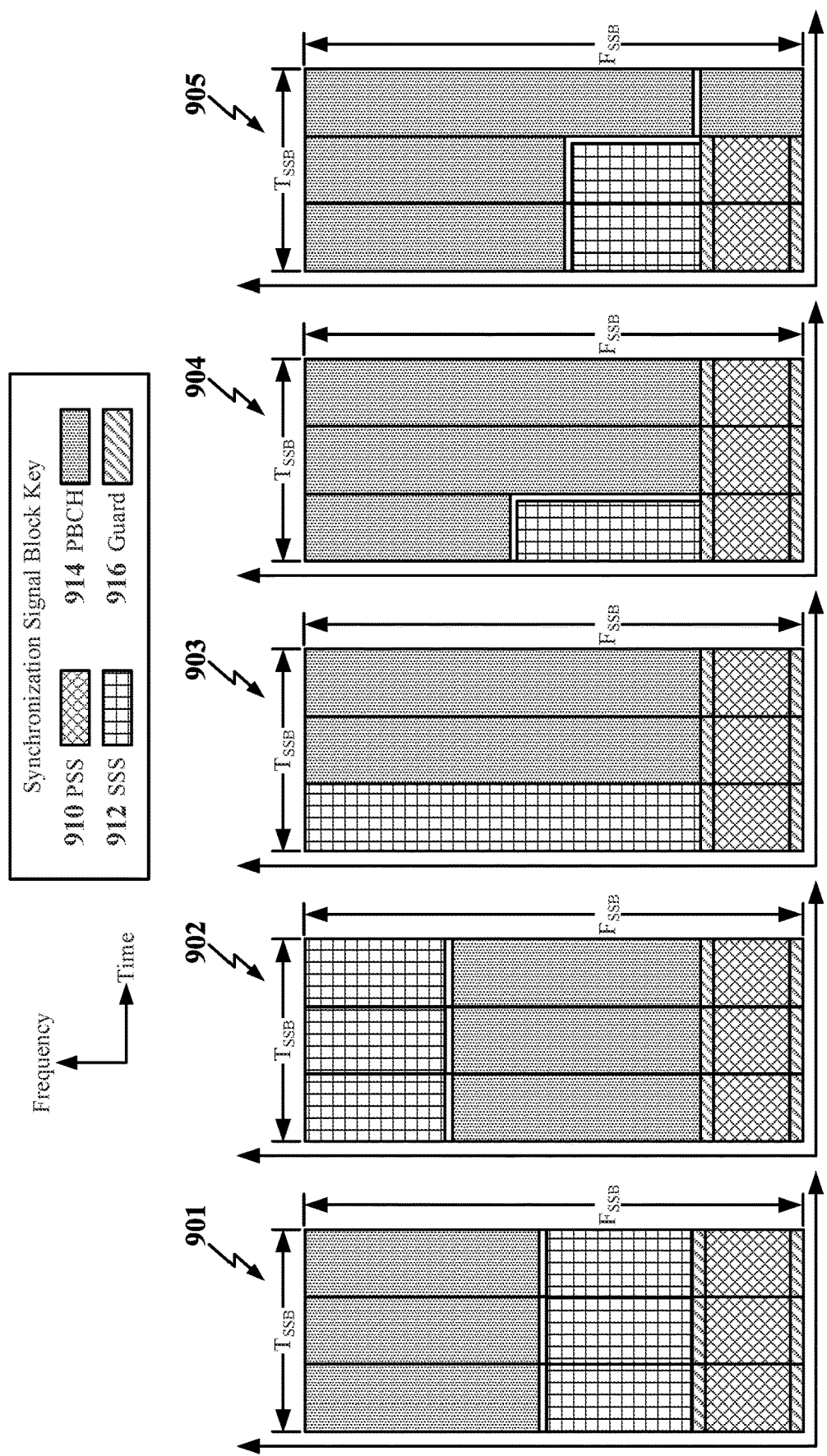
FIG. 9 is an illustration of portions of OFDM resource grids depicting resource mappings and measurement window configurations for examples of five synchronization signal blocks according to some aspects of the disclosure.

FIG. 9 is an illustration of portions of OFDM resource grids depicting resource mappings and measurement window configurations for examples of five synchronization signal blocks (SSBs) 901-905 according to some aspects of the disclosure. The SSBs may be configured with a beamformed PSS. The SSBs may be transmitted in a beamformed SSB via a Uu reference point (e.g., a Uu link, a link between a scheduled entity and a UE) and/or via a PC5 reference point (e.g., a PC5 sidelink between UEs configured to operate in sidelink). The SSBs may be transmitted in licensed or shared spectrum, all according to aspects of the disclosure.

Each of the first SSB 901, the second SSB 902, the third SSB 903, the fourth SSB 904, and the fifth SSB 905 occupies a resource grid area of $T_{SSB}$ time units by $F_{SSB}$ frequency units. In some examples, the time units may be given in terms of a quantity of symbols or a quantity of sub-slots. In some examples, the frequency units may be given in terms of a quantity of REs, a quantity of RE groups, a quantity of PRBs, or a quantity of PRB groups.

According to some aspects, $T_{SSB} \geq 1$ and is a positive integer. $T_{SSB}$ may be less than, equal to, or greater than a quantity of physical channels in an SSB.

According to some aspects, $F_{SSB} \geq 1$ and is a positive integer. $F_{SSB}$ may be less than, equal to, or greater than the number of physical channels in the SSB.

In some examples, $T_{SSB}$ and $F_{SSB}$ may be jointly configured to obtain a constant, k, and may be given as $T_{SSB}*F_{SSB}=k$. As $T_{SSB}$ and $F_{SSB}$ are positive integers, k is also a positive integer.

Within an SSB, according to some aspects of the disclosure, PSS 910 (including guard band(s) 916) may be mapped to $1 \leq T_{PSS} \leq T_{SSB}$ time units and $1 \leq F_{PSS} \leq F_{SSB}$ frequency units. According to some examples, the guard band(s) 916 may be optional.

The time-frequency resources assigned to PSS 910 may be equal to or less than the time-frequency resources assigned to SSS 912. To express this in another way, $T_{PSS}*F_{PSS} \leq T_{SSS}*F_{SSS} \leq T_{SSB}*F_{SSB}$.

As shown in the examples of the first SSB 901, the second SSB 902, the third SSB 903, the fourth SSB 904, and the fifth SSB 905, the PSS 910 may be multiplexed with the SSS 912, and the PBCH 914 in time, in frequency, or in both time and frequency. The examples of the multiplexing patterns depicted by the first SSB 901, the second SSB 902, the third SSB 903, the fourth SSB 904, and the fifth SSB 905 are provided for exemplary and non-limiting purposes. Other multiplexing patterns of the PSS 910, the SSS 912, and the PBCH 914 (and optionally the guard band(s) 916) within one SSB (where the one SSB occupies $T_{SSB}$ units in the time domain by $F_{SSB}$ units in the frequency domain) are within the scope of the disclosure.

According to some aspects of the disclosure, a first SSB (e.g., of any of the exemplary first through fifth SSBs 901-905 and/or similarly configured SSBs) of an SSB burst set may be mapped to an nth symbol of a slot, where $1 \leq n \leq T_{SSB}$.

According to some aspects of the disclosure, a UE may obtain the timing of the neighbor cell or neighbor TRP (both referred to herein as a neighbor cell) SSBs for layer 1 (L1) and/or layer 3 (L3) measurements. In some examples, a serving cell of the UE may transmit the timing of the neighbor cell SSBs, SSB burst sets, or SMTC window information (such as, but not limited to SMTC window 836, 846 (FIG. 8)), and the UE may receive, from the serving cell transmission, the timing of the neighbor cell SSBs, SSB burst sets, or SMTC window information.

In connection with the transmission and reception of the neighbor cell SSB information, inter-cell or inter-TRP mobility may be initiated by the network (NW) or by the UE, and the mobility procedures may be triggered by L1 measurements, L3 measurements, or both L1 and L3 measurements.

According to some aspects, SSB measurement timing configuration (SMTC) may be based on the resource mapping for beamformed SSS 912 and PBCH 914, as shown and described in connection with FIG. 9.

Figure 10A:
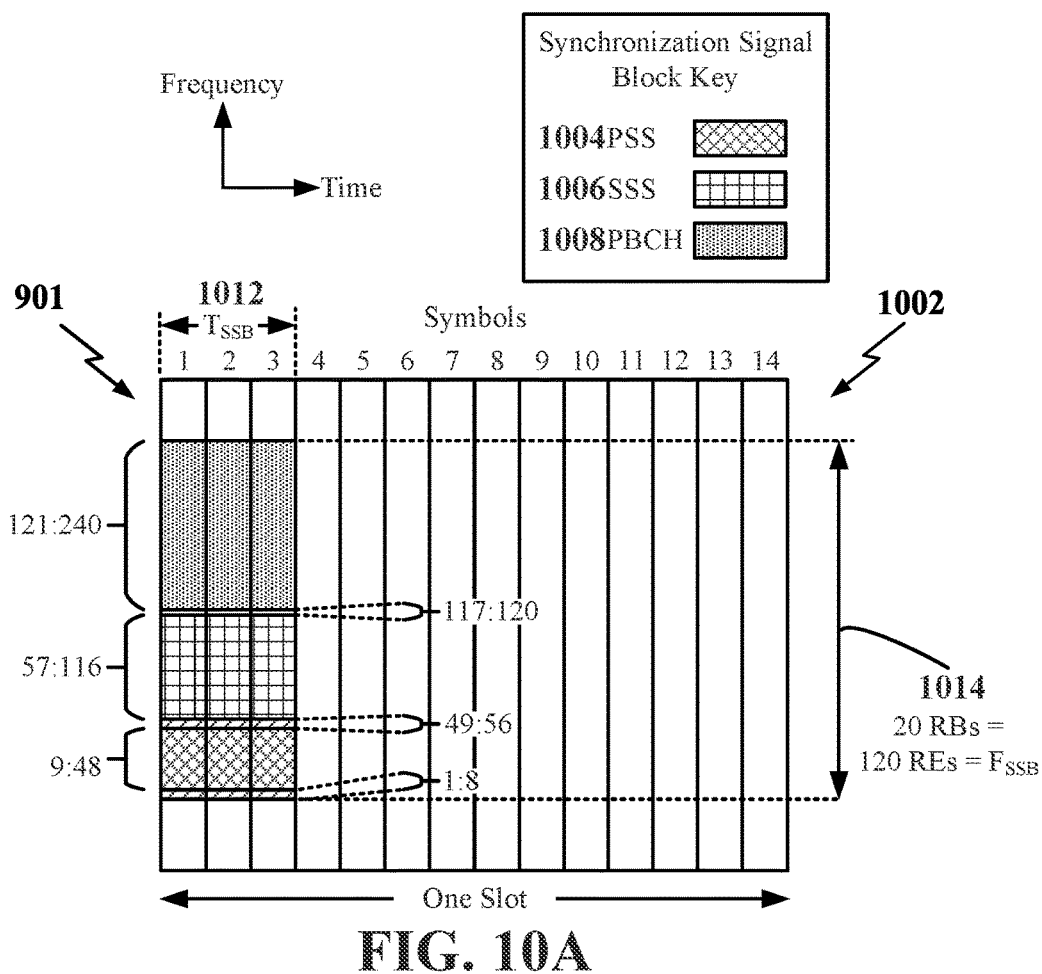
FIGS. 10A and 10B are illustrations of portions of OFDM resource grids depicting resource mappings and measurement window configurations for examples of two synchronization signal blocks according to some aspects of the disclosure.
Figure 10B:
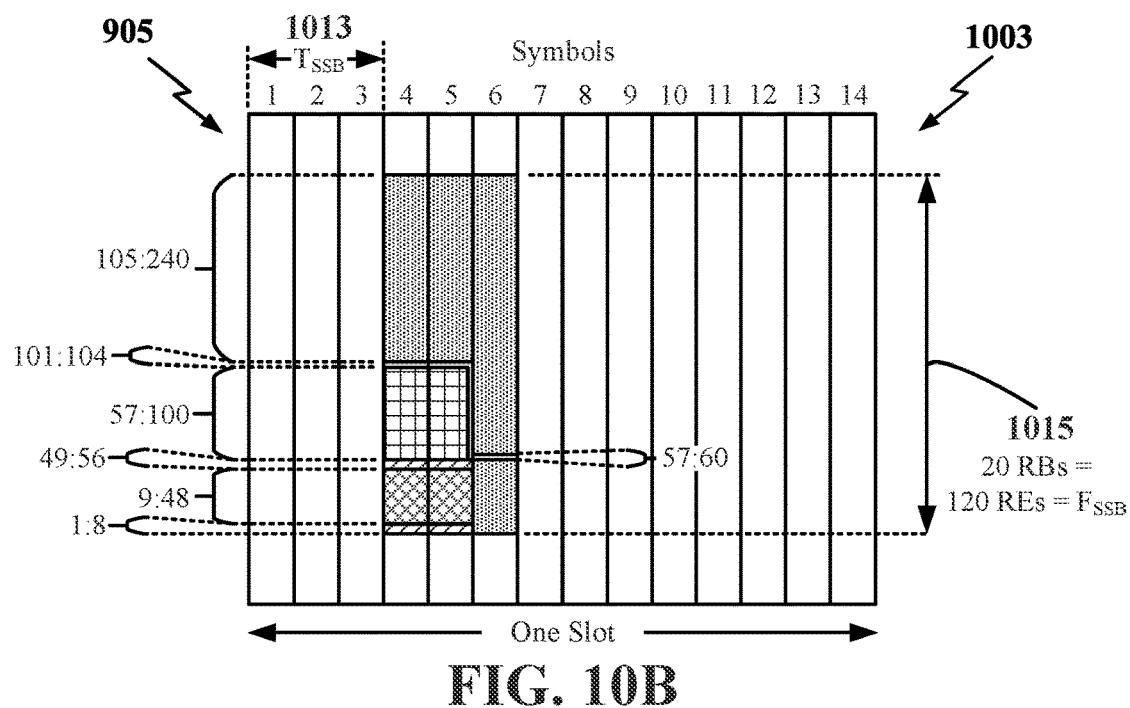

FIGS. 10A and 10B are illustrations of portions of OFDM resource grids depicting resource mappings and measurement window configurations for examples of two synchronization signal blocks according to some aspects of the disclosure. FIG. 10A illustrates the SSB 901 of FIG. 9 in a slot 1002 according to some aspects of the disclosure. The SSB 901 is configured in resources that convey a primary synchronization signal (PSS) 1004, a secondary synchronization signal (SSS) 1006, and a physical broadcast channel (PBCH) 1008 within an SSB resource area of the time-frequency resource grid. The SSB 901 is bounded in time by a first configured integer number of time units (e.g., $T_{SSB}$ 1012 time units, where $T_{SSB}$=3 symbols for illustrative and non-limiting purposes) and bounded in frequency by a second configured integer number of physical channels (e.g., $F_{SSB}$ 1014, where $F_{SSB}$=240 physical channels for illustrative and non-limiting purposes).

In the example of FIG. 10A, a product of the first configured integer number (i.e., 3) and the second configured integer number (i.e., 240) is a predetermined constant value (i.e., 720). Each symbol of the SSB 901 (e.g., the first symbol (1) of the slot 1002, the second symbol (2) of the slot 1002, and the third symbol (3) of the slot 1002) has an equal number of resource elements (REs) (i.e., 240 REs). All REs in the each symbol of the SSB 901, except REs within a first frequency guard band between any two of the PSS, the SSS, and the PBCH in the each symbol of the SSB 901, have non-zero values. The guard bands between the PSS 1004 and the SSS 1006 include REs at subcarriers 49 to 56 across the first through third symbols. The guard bands between the SSS 1006 and the PBCH 1008 include REs at subcarriers 117 to 120 across the first through third symbols. An additional guard band is shown below the PSS 1004 and includes REs at subcarriers 1 to 8 across the first through third symbols.

FIG. 10B depicts the SSB 905 of FIG. 9 in a slot 1003 according to some aspects of the disclosure. The SSB 905 is configured in resources that convey a primary synchronization signal (PSS) 1004, a secondary synchronization signal (SSS) 1006, and a physical broadcast channel (PBCH) 1008 within an SSB resource area of the time-frequency resource grid. The SSB 905 is bounded in time by a first configured integer number of time units (e.g., $T_{SSB}$ 1013 time units, where $T_{SSB}$=3 symbols for illustrative and non-limiting purposes) and bounded in frequency by a second configured integer number of physical channels (e.g., $F_{SSB}$ 1015, where $F_{SSB}$=240 physical channels for illustrative and non-limiting purposes).

In the example of FIG. 10B, a product of the first configured integer number (i.e., 3) and the second configured integer number (i.e., 240) is a predetermined constant value (i.e., 720). Each symbol of the SSB 905 (e.g., the fourth symbol (4) of the slot 1003, the fifth symbol (5) of the slot 1003, and the sixth symbol (6) of the slot 1003) has an equal number of resource elements (REs) (i.e., 240 REs). All REs in the each symbol of the SSB 905, except REs within a first frequency guard band between any two of the PSS, the SSS, and the PBCH in the each symbol of the SSB 905, have non-zero values. The guard bands between the PSS 1004 and the SSS 1006 include REs at subcarriers 49 to 56 across the fourth and fifth symbols of the slot 1003. The guard bands between the SSS 1006 and the PBCH 1008 include REs at subcarriers 101 to 104 across the fourth and fifth symbols of the slot 1003. An additional guard band is shown between portions of the PBCH 1008 and includes subcarriers 57 to 60 in the sixth symbol of the slot 1003.

Figure 11:
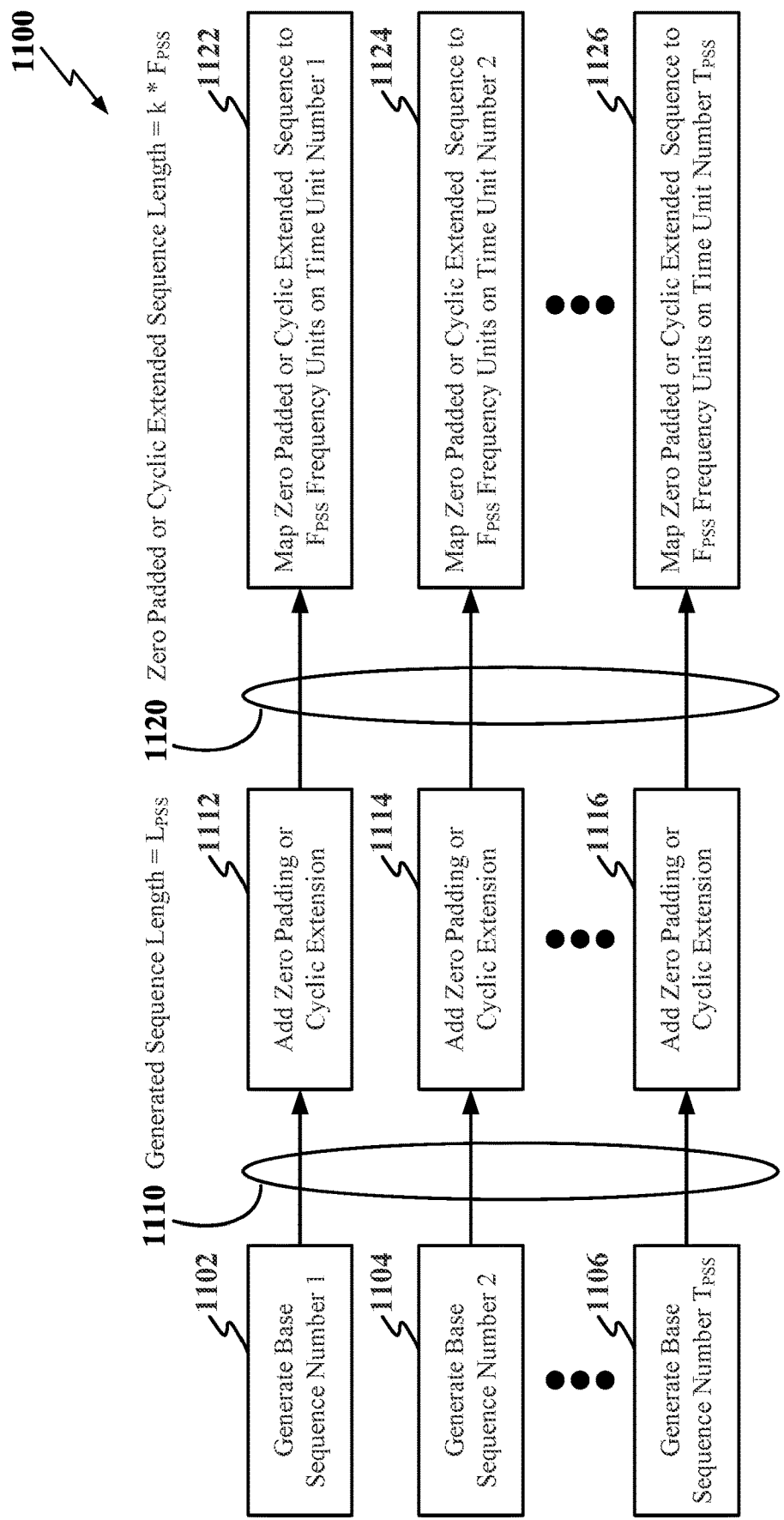
FIG. 11 is a flow chart illustrating an example process of PSS sequence generation in accordance with some aspects of the disclosure.

FIG. 11 is a flow chart 1100 illustrating an example process of PSS sequence generation in accordance with some aspects of the disclosure. Some aspects of the disclosure may relate to generating a PSS sequence (such as, but not limited to, any of the PSS sequences as shown and described in connection with FIGS. 9 and 10).

In the example of FIG. 11, for a PSS spanning $T_{PSS}$>1 time unit, a corresponding PSS sequence may be partitioned into $T_{PSS}$ segments. Each segment of the PSS sequence may be associated with a base sequence of length $L_{PSS}$, where $1 < L_{PSS} \leq k*F_{PSS}$ and k is a constant denoting the number of resource elements per frequency unit. According to some aspects, the $T_{PSS}$ base sequences associated with the PSS may be cell-specific or zone-specific. The $T_{PSS}$ base sequences are mutually orthogonal or quasi-orthogonal in the time domain, frequency domain, or in both the time and frequency domains. According to the example of FIG. 11, the $T_{PSS}$ base sequences associated with the PSS may be padded with zeros, or extended cyclically to the same length, $k*F_{PSS}$.

At block 1102, a device (e.g., a network entity, an aggregated or disaggregated base station, a gNB, an eNB, a TRP, a scheduling entity) may generate a first base sequence (i.e., may generate base sequence number 1). At block 1104, the device may generate a second base sequence (i.e., may generate base sequence number 2). At block 1106, the device may generate a $T_{PSS}^{th}$ base sequence (i.e., may generate base sequence number $T_{PSS}$). As indicated at point 1110, each of the respective generated base sequences may have a length of $L_{PSS}$ (where L is the maximum number of SSBs in an SSB burst set and may be configured by a network).

At block 1112, the device may add zero padding or a cyclic extension (i.e., first zero padding or a first cyclic extension) to the base sequence number 1, generated at block 1102. At block 1114, the device may add zero padding or a cyclic extension (i.e., second zero padding or a second cyclic extension) to the base sequence number 2, generated at block 1104. At block 1116, the device may add zero padding or a cyclic extension (i.e., $T_{PSS}^{th}$ zero padding or a $T_{PSS}^{th}$ cyclic extension) to the base sequence number $T_{PSS}$, generated at block 1106. As indicated at point 1120, each of the respective zero-padded or cyclic extended base sequences may have a length of $k*L_{PSS}$ (where k is a constant equal to $T_{PSS}*F_{PSS}$, and L is the maximum number of SSBs in the SSB burst set and a network may configure both k and L).

At block 1122, the device may map the zero-padded or cyclic extended sequence (i.e., the first zero-padded or the first cyclic extended base sequence number 1 obtained at block 1112) to $F_{PSS}$ frequency units on a first time unit (i.e., on time unit number 1). At block 1124, the device may map the zero-padded or cyclic extended sequence (i.e., the second zero-padded or the second cyclic extended base sequence number 2 obtained at block 1114) to $F_{PSS}$ frequency units on a second time unit (i.e., on time unit number 2). At block 1126, the device may map the zero-padded or cyclic extended sequence (i.e., the $T_{PSS}^{th}$ zero-padded or the $T_{PSS}^{th}$ cyclic extended base sequence number $T_{PSS}$ obtained at block 1116) to $F_{PSS}$ frequency units on a $T_{PSS}^{th}$ time unit (i.e., on time unit number $T_{PSS}$). Accordingly, for any given SSB having $T_{PSS}$ time units, the PSS sequence may be partitioned into $T_{PSS}$ segments.

Figure 12:
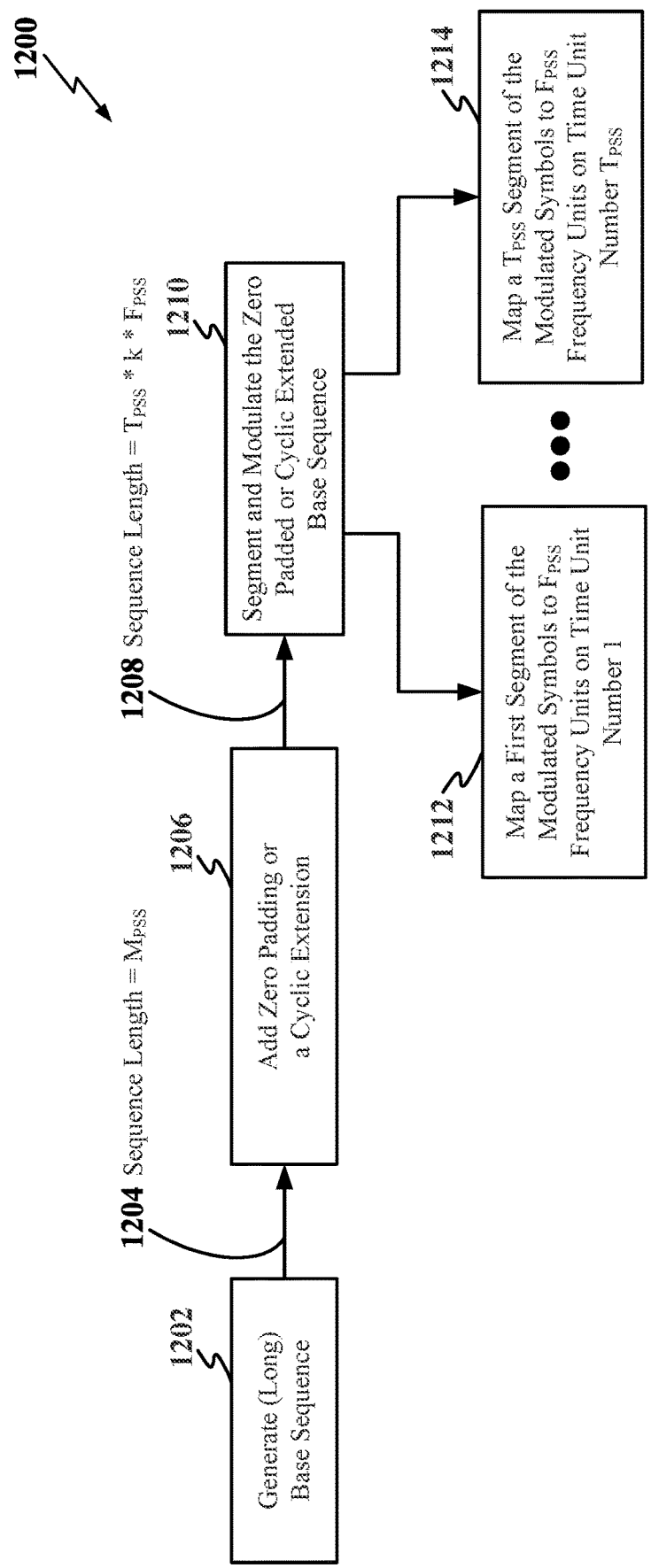
FIG. 12 is a flow chart illustrating an example process of PSS sequence generation in accordance with some aspects of the disclosure.

FIG. 12 is a flow chart 1200 illustrating an example process of PSS sequence generation in accordance with some aspects of the disclosure. In the example of FIG. 12, for a PSS spanning $T_{PSS}$>1 time unit, a corresponding PSS sequence may be associated with a cell-specific or zone-specific base sequence of length $M_{PSS}$. The base sequence of length $M_{PSS}$ may be padded with zeros or cyclically extended to a length given as $T_{PSS}*k*F_{PSS}$ and may be partitioned uniformly into $T_{PSS}$ segments. In accordance with the example of FIG. 12, k may be a constant denoting a quantity of resource elements per frequency unit. In the example of FIG. 12, each $T_{PSS}$ segment may be mapped to $k*F_{PSS}$ resource elements.

At block 1202, a device may generate a base sequence. According to some aspects, the base sequence may be a long base sequence. As indicated at point 1204, the generated base sequence may have a length (i.e., a sequence length) equal to $M_{PSS}$.

At block 1206, the device may add zero padding or a cyclic extension to the base sequence generated at block 1202. As indicated at point 1208, the generated base sequence with the added zero padding or cyclic extension may have a length (i.e., a sequence length) equal to $T_{PSS}*k*F_{PSS}$. In other words, after zero padding or cyclic extension, the base sequence of length $M_{PSS}$ is transformed into a new binary sequence of length $T_{PSS}*k*F_{PSS}$, where k is an integer denoting modulation order.

At block 1210, the device may segment and modulate the zero-padded or cyclic extended base sequence obtained at block 1206. There may be $T_{PSS}$ segments. For example, at block 1212, the device may map a first segment of the modulated symbols to $F_{PSS}$ frequency units on a first time unit (i.e., time unit number 1). For example, at block 1214, the device may map a $T_{PSS}$ segment of the modulated symbols to $F_{PSS}$ frequency units on a $T_{PSS}$ time unit (i.e., time unit number $T_{PSS}$). Accordingly, for any given SSB having $T_{PSS}$ time units, the PSS sequence may be partitioned into $T_{PSS}$ segments. In other words, after segmentation, the new binary sequence may be modulated onto $2^k$ constellation (e.g., if k=1, binary phase shift keying (BPSK) modulation; if k=2, quadrature phase shift keying (QPSK) modulation; if k=4, 16 quadrature amplitude modulation (QAM)). After modulation, there are a total of $T_{PSS}*F_{PSS}$ symbols (with modulation order $2^k$).

Figure 13:
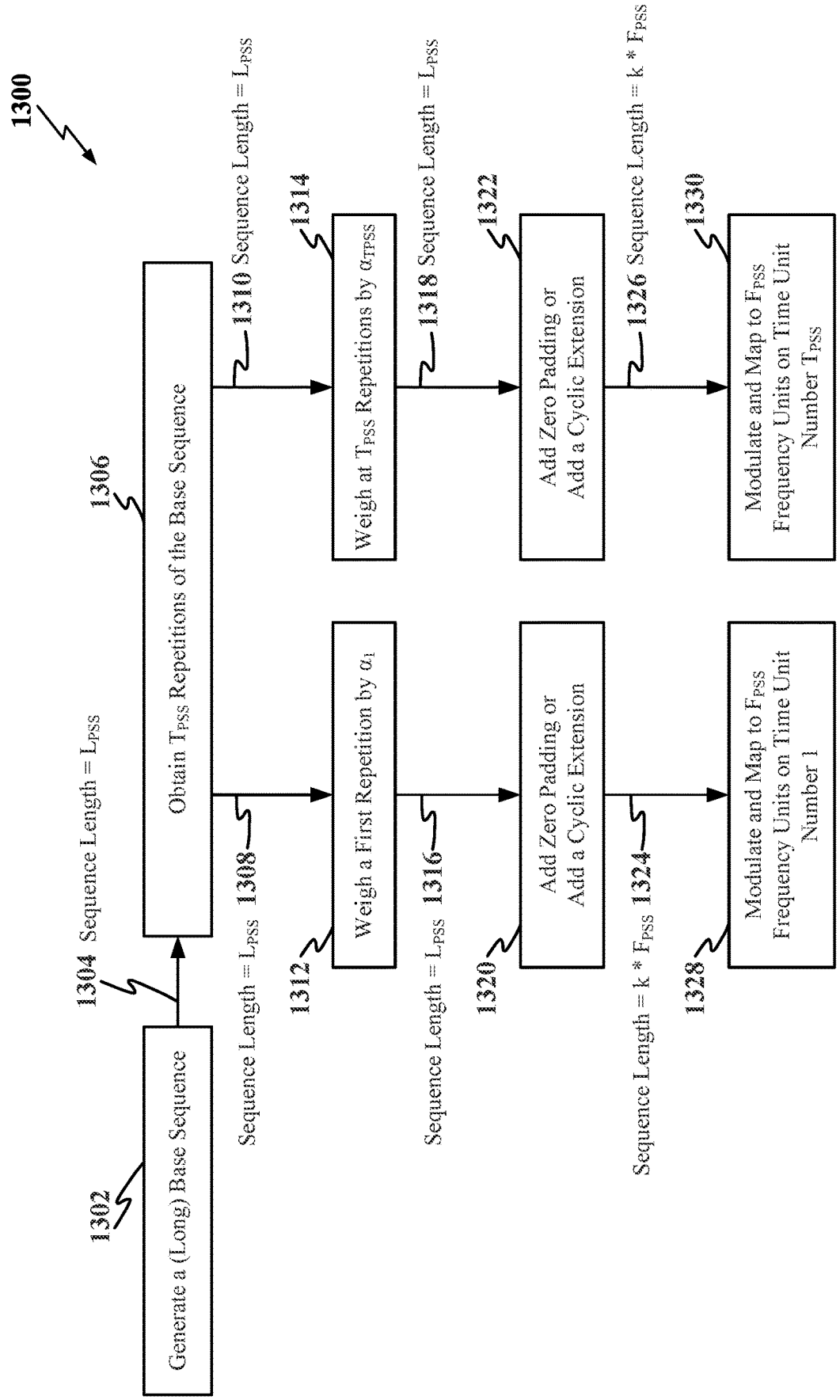
FIG. 13 is a flow chart illustrating an example process of PSS sequence generation in accordance with some aspects of the disclosure.

FIG. 13 is a flow chart 1300 illustrating an example process of PSS sequence generation in accordance with some aspects of the disclosure. In the example of FIG. 13, for a PSS spanning $T_{PSS}>1$ time unit, the corresponding PSS sequence may be associated with multiple repetitions of a cell-specific or zone-specific base sequence of length $L_{PSS}$. According to some aspects of the disclosure, the base sequence may be repeated $T_{PSS}$ times. The $t^{th}$ (where $1 \leq t \leq T_{PSS}$) replica of the base sequence may be weighted by a non-zero symbol at of a code cover, padded with zeros or cyclically extended to length $k*F_{PSS}$, and mapped to $F_{PSS}$ frequency units on time unit number t. According to the example of FIG. 13, k may be a constant denoting the number of resource elements per frequency unit.

At block 1302, a device may generate a base sequence. According to some aspects, the base sequence may be a long base sequence. As indicated at point 1304, the generated base sequence may have a length (i.e., a sequence length) equal to $L_{PSS}$.

At block 1306, the device may obtain (e.g., generate, calculate, derive, produce) $T_{PSS}$ repetitions of the base sequence generated at block 1302. As indicated at point 1308 (for the first repetition) and point 1310 for the $T_{PSS}^{th}$ repetition, each replicated base sequence may continue to have a length (i.e., a sequence length) equal to $L_{PSS}$.

At block 1312, the device may weigh a first repetition using a first weighting factor, $\alpha_1$. Each repetition is similarly weighted with a respective weighting factor. For example, at block 1314 the $T_{PSS}^{th}$ repetition is weighted by a $T_{PSS}^{th}$ weighting factor, $\alpha_{T_{PSS}}$. As indicated at point 1316 (for the first weighted repetition) and point 1318 for the $T_{PSS}^{th}$ weighted repetition, each replicated and weighted base sequence may continue to have a length (i.e., a sequence length) equal to $L_{PSS}$.

At block 1320, the device may add zero padding or a cyclic extension to the weighted first repetition obtained at block 1312. Each repetition is similarly padded or provided with a cyclic extension. For example, at block 1322 the $T_{PSS}^{th}$ weighted repetition has zero padding or a cyclic repetition added to it. As indicated at point 1324 (for the first weighted padded or cyclic extended repetition) and point 1326 for the $T_{PSS}^{th}$ weighted padded or cyclic extended repetition, each weighted padded or cyclic extended replication may have a sequence length equal to $k*F_{PSS}$.

At block 1328, the device may modulate and map the weighted zero-padded or cyclically extended repetition to $F_{PSS}$ frequency units on time unit number 1. Each repetition is similarly mapped. For example, at block 1330 the $T_{PSS}^{th}$ weighted zero-padded or cyclically extended repetition is modulated and mapped to $F_{PSS}$ frequency units on time unit number $T_{PSS}$. Accordingly, for any given SSB with $T_{PSS}$ time units, the PSS sequence may be associated with multiple repetitions of a cell-specific or zone-specific base sequence of length LPSS (or, after padding and cyclic extension) of length $k*F_{PSS}$.

Some aspects of the disclosure may relate to UE procedures for partial SSB reception. In an example where an active DL BWP associated with a given UE includes the entireties of both the PSS and the SSS, but not the entire PBCH of a serving cell, the given UE may use the PSS at least for synchronization, phase noise mitigation, and tracking loop maintenance (e.g., AGC, Doppler shift). The given UE may also use the SSS at least for L1/L3 measurements (e.g., RRM, RLM, BFD, BM), channel estimation, synchronization, tracking loop maintenance, and phase noise estimation.

In examples where the active DL BWP associated with the given UE includes SSS/PBCH, but not the entire PSS of a serving cell/neighbor cell, the UE may use SSS/PBCH at least for L1/L3 measurements, channel estimation, synchronization, tracking loop maintenance, and phase noise estimation.

According to some aspects, at a beginning of a cell search, a given UE may conduct a fast frequency scan based on PSS, perform correlation in time and/or frequency domain and employ a low-sampling rate (i.e., a sampling rate that is proportional to a BW of the PSS in contrast to a BW of an entire SSB) to reduce the power consumption and complexity of the given UE.

Figure 14:
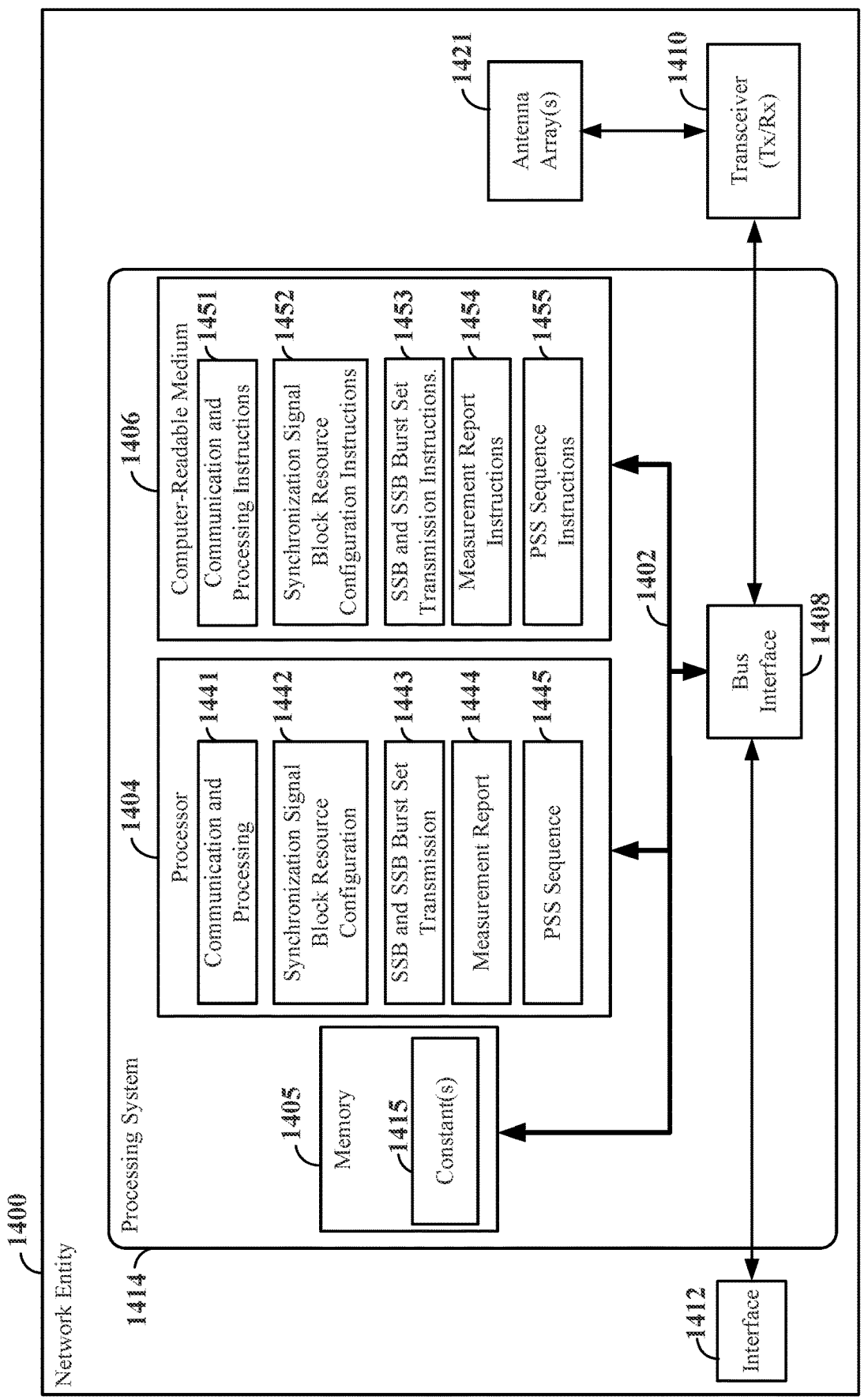
FIG. 14 is a block diagram illustrating an example of a hardware implementation of a network entity employing one or more processing systems according to some aspects of the disclosure.

FIG. 14 is a block diagram illustrating an example of a hardware implementation of a network entity 1400 (e.g., a base station, an aggregated or disaggregated base station, a gNB, a TRP, a scheduling entity) employing one or more processing systems (generally represented by processing system 1414) according to some aspects of the disclosure. The network entity 1400 may be similar to, for example, any of the scheduling entities or base stations of FIGS. 1, 2, and/or 3.

In accordance with various aspects of the disclosure, an element, any portion of an element, or any combination of elements may be implemented with a processing system 1414 that includes one or more processors, generally represented by processor 1404. Examples of processor 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network entity 1400 may be configured to perform any one or more of the functions described herein. That is, the one or more processors (generally represented by processor 1404), as utilized in the network entity 1400, may be configured to, individually or collectively, implement any one or more of the methods or processes described and illustrated, for example, in FIGS. 7, 8A, 8B, 9, 10A, 10B, 11, 12, and/or 13.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits, including one or more processors (represented generally by the processor 1404), one or more memories (represented generally by a memory 1405), and one or more computer-readable media (represented generally by the computer-readable medium 1406). The bus 1402 may also link various other circuits such as timing sources, peripherals, voltage regulators, and power management circuits, which are well known to persons having ordinary skill in the art, and, therefore, will not be described any further.

A bus interface 1408 provides an interface between the bus 1402 and a transceiver 1410. The transceiver 1410 may be, for example, a wireless transceiver. The transceiver 1410 may be operational with multiple RATs (e.g., LTE, 5G NR, IEEE 802.11 (WiFi®), etc.). The transceiver 1410 may provide respective means for communicating with various other apparatus, UEs, and core networks over a transmission medium (e.g., air interface). The transceiver 1410 may be coupled to one or more respective antenna array(s) 1421. The bus interface 1408 may provide an interface between the bus 1402 and a user interface 1412 (e.g., keypad, display, touch screen, speaker, microphone, control features, vibration circuit/device, etc.). Of course, such a user interface 1412 is optional and may be omitted in some examples.

One or more processors, represented individually and collectively by processor 1404, may be responsible for managing the bus 1402 and general processing, including the execution of software stored on the computer-readable medium 1406. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1406. The software, when executed by the processor 1404, causes the processing system 1414 to perform the various processes and functions described herein for any particular apparatus.

The computer-readable medium 1406 may be a non-transitory computer-readable medium and may be referred to as a computer-readable storage medium or a non-transitory computer-readable medium. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities, including the processing system 1414. The computer-readable medium 1406 may be embodied in a computer program product or article of manufacture. By way of example, a computer program product or article of manufacture may include a computer-readable medium in packaging materials. In some examples, the computer-readable medium 1406 may be part of the memory 1405. Persons having ordinary skill in the art will recognize how best to implement the described functionality presented throughout this disclosure depending on the particular application and the overall design constraints imposed on the overall system. The computer-readable medium 1406 and/or the memory 1405 may also be used for storing data that is manipulated by the processor 1404 when executing software. For example, the memory 1405 may store one or more constants 1415 (e.g., the constant k) that may be used in configuring SSB(s) or generating PSS sequences.

In some aspects of the disclosure, the processor 1404 may include communication and processing circuitry 1441 configured for various functions, including, for example, communicating with a UE (e.g., a wireless communication device), another network entity, and/or a core network. In some examples, the communication and processing circuitry 1441 may include one or more hardware components that provide the physical structure that performs processes related to wireless communication (e.g., signal reception and/or signal transmission) and signal processing (e.g., processing a received signal and/or processing a signal for transmission). The communication and processing circuitry 1441 may further be configured to execute communication and processing instructions 1451 (e.g., software) stored on the computer-readable medium 1406 to implement one or more functions described herein.

In some aspects of the disclosure, the processor 1404 may include synchronization signal block resource configuration circuitry 1442 configured for various functions, including, for example, configuring a synchronization signal block (SSB) using SSB resources that convey a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels, where a product of the first configured integer number and the second configured integer number is a predetermined constant value (e.g., the constant value, k, stored in constant(s) 1415 storage location of the memory 1405). The configuring of the SSB may be based on each symbol of the SSB having an equal number of resource elements (REs) and all REs in the each symbol of the SSB, except REs within a first frequency guard band between any two of the PSS, the SSS, and the PBCH in the each symbol of the SSB, having non-zero values. According to some aspects, the first configured integer number of time units may be expressed in units of symbols, mini-slots, or sub-slots. According to some aspects, the second configured integer number of physical channels is expressed in units of resource elements (REs), RE groups, physical resource blocks (PRBs), or PRB groups. According to some aspects, a first time duration of the PSS is less than or equal to a total time duration of the SSB (examples of the total time duration of the SSB may be given by $T_{SSB}$ associated with SSBs 901-905 as shown and described in connection with FIGS. 9, 10A, and 10B). According to some aspects, within the SSB, the PSS may be multiplexed with the SSS and the PBCH in time, frequency, or in both time and frequency. The synchronization signal block resource configuration circuitry 1442 may further be configured to execute synchronization signal block resource configuration instructions 1452 (e.g., software) stored on the computer-readable medium 1406 to implement one or more functions described herein.

In some aspects of the disclosure, the processor 1404 may include SSB and SSB burst set transmission circuitry 1443 configured for various functions, including, for example, transmitting the SSB in the SSB resources as a beamformed SSB. According to some aspects, the SSB may be transmitted via a Uu or PC5 reference point. According to some aspects, the SSB may be a first SSB of a plurality of SSBs in an SSB burst set, and the SSB and SSB burst set transmission circuitry 1443 may further be configured to map a first symbol of the first SSB to an nth symbol of a slot, where n is an integer that is greater than or equal to two and less than or equal to a total number of time units (e.g., $T_{SBB}$) in the first SSB. The SSB and SSB burst set transmission circuitry 1443 may further be configured to execute SSB and SSB burst set transmission instructions 1453 (e.g., software) stored on the computer-readable medium 1406 to implement one or more functions described herein.

In some aspects of the disclosure, the processor 1404 may include measurement report circuitry 1444 configured for various functions, including, for example, receiving, from a user equipment, at least one of: a layer 1 (L1) measurement report, or a layer 3 (L3) measurement report based on measurements of SSB reference signals (SSB-RSs) within the SSB resource area. In some examples, the measurement report circuitry 1444 may be further configured to initiate an inter-cell or an inter-TRP mobility procedure triggered by at least one of: the L1 measurement report, or the L3 measurement report. According to some aspects, the measurement report circuitry 1444 may be configured to obtain a neighbor SSB measurement timing configuration (SMTC) data based on a configured neighbor SSB resource area, each symbol in the configured neighbor SSB resource area having an equal number of resource elements (REs), and all REs in each symbol in the configured neighbor SSB resource area, except REs within a second frequency guard band between any two of a neighbor PSS, a neighbor SSS, and a neighbor PBCH in the configured neighbor SSB resource area, have non-zero values. The first frequency guard band between any the two of the PSS, the SSS, and the PBCH in the each symbol of the SSB may have a same or a different bandwidth in comparison to the second frequency guard band between the any two of the neighbor PSS, the neighbor SSS, and the neighbor PBCH in the configured neighbor SSB resource area. The measurement report circuitry 1444 may still further be configured to transmit, to at least one user equipment (UE), the neighbor SMTC data and receive, from the at least one UE, at least one of: a layer 1 (L1) measurement report, or a layer 3 (L3) measurement report based on measured SSB reference signals (SSB-RSs) within the configured neighbor SSB resource area. In some examples, the neighbor may be a neighbor cell or a neighbor transmission reception point (TRP) serving the at least one UE. In such examples, the measurement report circuitry 1444 may be further configured to initiate an inter-cell or an inter-TRP mobility procedure, respectively, triggered by at least one of: the L1 measurement report, or the L3 measurement report. The measurement report circuitry 1444 may further be configured to execute measurement report instructions 1454 (e.g., software) stored on the computer-readable medium 1406 to implement one or more functions described herein.

In some aspects of the disclosure, the processor 1404 may include PSS sequence circuitry 1445. In examples where the PSS spans $T_{PSS}$ time units, $T_{PSS}$ is greater than one, the PSS occupies $F_{PSS}$ frequency units, and the PSS is expressed as a PSS sequence, the PSS sequence circuitry 1445 may be configured for various functions, including, for example, partitioning the PSS sequence into $T_{PSS}$ segments, and mapping each of the $T_{PSS}$ segments to the $F_{PSS}$ frequency units at each of the $T_{PSS}$ time units. In some examples, each of the $T_{PSS}$ segments is associated with a respective base sequence of length $L_{PSS}$, and $L_{PSS}$ is greater than one and less than or equal to $k^*F_{PSS}$, k being a constant equal to a quantity of resource elements per frequency unit expressed in units of resource elements (REs), RE groups, physical resource blocks (PRBs), or PRB groups. In some examples, each of the $T_{PSS}$ segments is associated with the respective base sequence, the respective base sequence is cell-specific or zone-specific, and the respective base sequence is mutually orthogonal or quasi-orthogonal with respect to all other ones of the respective base sequences in a time domain, a frequency domain, or both the time and the frequency domain. In some examples, each of the $T_{PSS}$ segments is associated with a respective base sequence, and the respective base sequence is configurable to be padded with zeros or extended cyclically to a length equal to $k^*F_{PSS}$, k being a constant equal to a quantity of resource elements per frequency unit expressed in units of resource elements (REs), RE groups, physical resource blocks (PRBs), or PRB groups.

In some examples, where the PSS spans $T_{PSS}$ time units, $T_{PSS}$ is greater than one, the PSS occupies $F_{PSS}$ frequency units, and the PSS is expressed as a PSS sequence associated with a cell-specific or zone-specific base sequence of length $M_{PSS}$, the cell-specific or zone-specific base sequence of length $M_{PSS}$ is configurable to be padded with zeros, or cyclically extended, to a length equal to $T_{PSS}^*k^*F_{PSS}$, k being a constant equal to a quantity of resource elements per frequency unit expressed in units of resource elements (REs), RE groups, physical resource blocks (PRBs), or PRB groups. In such examples, the PSS sequence circuitry 1445 may be configured to partition the base sequence of length $M_{PSS}$ uniformly into $T_{PSS}$ segments and map each of the $T_{PSS}$ segments to the $F_{PSS}$ frequency units at each of the $T_{PSS}$ time units.

In some examples where PSS spans $T_{PSS}$ time units, $T_{PSS}$ is greater than one, the PSS occupies $F_{PSS}$ frequency units, and the PSS is expressed as a PSS sequence associated with multiple repetitions of a cell-specific or zone-specific base sequence of length $L_{PSS}$, the PSS sequence circuitry 1445 may be configured to repeat the cell-specific or zone-specific base sequence of length $L_{PSS}$ $T_{PSS}$ times, weight each respective repetition of the $T_{PSS}$ repetitions with a respective non-zero symbol α of a code cover, pad with zeros, or cyclically extend, each respective weighted repetition of the $T_{PSS}$ repetitions to a length equal to $k^*F_{PSS}$, k being a constant equal to a quantity of resource elements per frequency unit expressed in units of resource elements (REs), RE groups, physical resource blocks (PRBs), or PRB groups, and map each respective weighted and padded or cyclically extended repetitions of the $T_{PSS}$ repetitions to the $F_{PSS}$ frequency units at each of the $T_{PSS}$ time units. The PSS sequence circuitry 1445 may further be configured to execute PSS sequence instructions 1455 (e.g., software) stored on the computer-readable medium 1406 to implement one or more functions described herein.

In general, a network entity, such as the network entity 1400, may include one or more memories (e.g., represented by memory 1405), and one or more processors (e.g., represented by processor 1404), the one or more processors may be configured to, individually or collectively, based at least in part on information stored in the one or more memories: perform any of the processes described herein.

Figure 15:
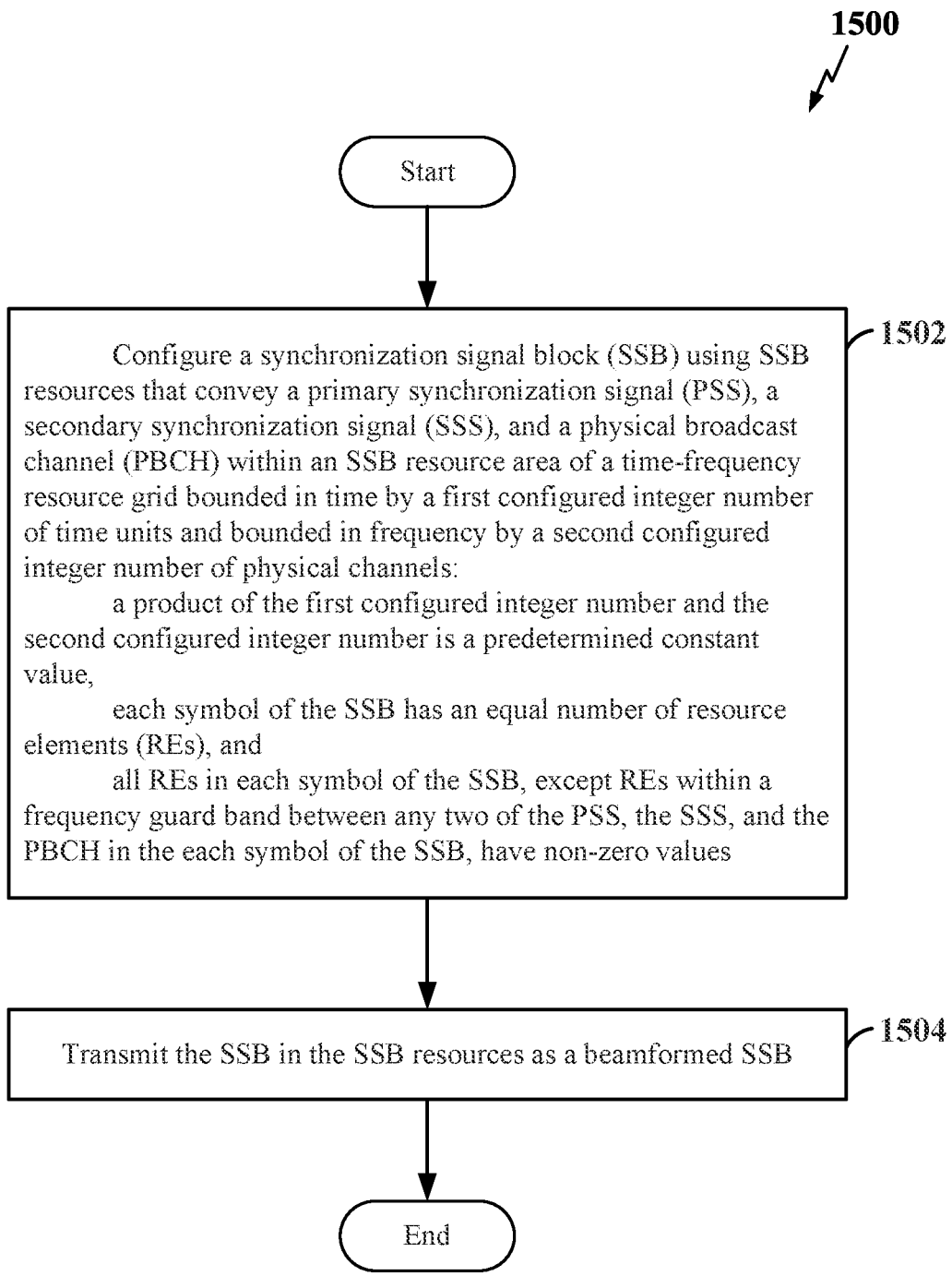
FIG. 15 is a flow chart illustrating an example process of wireless communication at a network entity in accordance with some aspects of the disclosure.

FIG. 15 is a flow chart illustrating an example process 1500 (e.g., a method) of wireless communication at a network entity in accordance with some aspects of the disclosure. As described below, some or all illustrated features may be omitted in a particular implementation within the scope of the present disclosure, and some illustrated features may not be required for implementation of all embodiments. In some examples, the process 1500 may be carried out by the network entity 1400, as shown and described in connection with FIG. 14. The network entity 1400 may be similar to, for example, any of the scheduling entities of FIGS. 1, 2, and/or 3. In some examples, the process 1500 may be carried out by any suitable apparatus or means for carrying out the functions or algorithm described below.

At block 1502, the network entity may configure a synchronization signal block (SSB) using SSB resources that convey a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels. According to some aspects, a product of the first configured integer number and the second configured integer number may be a predetermined constant value, each symbol of the SSB has an equal number of resource elements (REs), and all REs in the each symbol of the SSB, except REs within a first frequency guard band between any two of the PSS, the SSS, and the PBCH in the each symbol of the SSB, have non-zero values. For example, the synchronization signal block resource configuration circuitry 1442, as shown and described in connection with FIG. 14, may provide a means for configuring a synchronization signal block (SSB) using SSB resources that convey a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels, where a product of the first configured integer number and the second configured integer number may be a predetermined constant value, each symbol of the SSB has an equal number of resource elements (REs), and all REs in the each symbol of the SSB, except REs within a first frequency guard band between any two of the PSS, the SSS, and the PBCH in the each symbol of the SSB, have non-zero values.

In some examples, the SSB is transmitted via a Uu reference point or a PC5 reference point. In some examples, the first configured integer number of time units is expressed in units of symbols, mini-slots, or sub-slots. In some examples, the second configured integer number of physical channels is expressed in units of resource elements (REs), RE groups, physical resource blocks (PRBs), or PRB groups. In some examples, a first time duration of the PSS is less than or equal to a total time duration of the SSB. In some examples, within the SSB, the PSS is multiplexed with the SSS and the PBCH in time, in frequency, or in both time and frequency.

According to some aspects, the SSB is a first SSB of a plurality of SSBs in an SSB burst set. In such aspects, the network entity may map a first symbol of the first SSB to an nth symbol of a slot, where n is an integer that is greater than or equal to two and less than or equal to a total number of time units in the first SSB. For example, the SSB and SSB burst set transmission circuitry 1443, as shown and described in connection with FIG. 14, may provide a means for mapping a first symbol of the first SSB to an nth symbol of a slot, where n is an integer that is greater than or equal to two and less than or equal to a total number of time units in the first SSB.

According to some aspects, the network entity may receive, from a user equipment, at least one of: a layer 1 (L1) measurement report, or a layer 3 (L3) measurement report based on measurements of SSB reference signals (SSB-RSs) within the SSB resource. The network entity may further initiate an inter-cell or an inter-TRP mobility procedure triggered by at least one of: the L1 measurement report, or the L3 measurement report. For example, the measurement report circuitry 1444, as shown and described in connection with FIG. 14, may provide a means for receiving, from a user equipment, at least one of: a layer 1 (L1) measurement report, or a layer 3 (L3) measurement report based on measurements of SSB reference signals (SSB-RSs) within the SSB resource. In some examples, the measurement report circuitry 1444 may also provide a means for initiating an inter-cell or an inter-TRP mobility procedure triggered by at least one of: the L1 measurement report, or the L3 measurement report.

According to some aspects, the network entity may obtain a neighbor SSB measurement timing configuration (SMTC) data based on a configured neighbor SSB resource area, each symbol in the configured neighbor SSB resource area having an equal number of resource elements (REs), and all REs in each symbol in the configured neighbor SSB resource area, except REs within a second frequency guard band between any two of a neighbor PSS, a neighbor SSS, and a neighbor PBCH in the configured neighbor SSB resource area, have non-zero values, transmit, to at least one user equipment (UE), the neighbor SMTC data, and receive, from the at least one UE, at least one of: a layer 1 (L1) measurement report, or a layer 3 (L3) measurement report based on measured SSB reference signals (SSB-RSs) within the configured neighbor SSB resource area. For example, the measurement report circuitry 1444, as shown and described in connection with FIG. 14, may provide a means for obtaining a neighbor SSB measurement timing configuration (SMTC) data based on a configured neighbor SSB resource area, each symbol in the configured neighbor SSB resource area having an equal number of resource elements (REs), and all REs in each symbol in the configured neighbor SSB resource area, except REs within a second frequency guard band between any two of a neighbor PSS, a neighbor SSS, and a neighbor PBCH in the configured neighbor SSB resource area, have non-zero values, transmitting, to at least one user equipment (UE), the neighbor SMTC data, and receiving, from the at least one UE, at least one of: a layer 1 (L1) measurement report, or a layer 3 (L3) measurement report based on measured SSB reference signals (SSB-RSs) within the configured neighbor SSB resource area.

According to some aspects, in examples where the neighbor is a neighbor cell or a neighbor transmission reception point (TRP) serving the at least one UE, the network entity may initiate an inter-cell or an inter-TRP mobility procedure, respectively, triggered by at least one of: the L1 measurement report, or the L3 measurement report. For example, the measurement report circuitry 1444, as shown and described in connection with FIG. 14, may provide a means for initiating an inter-cell or an inter-TRP mobility procedure, respectively, triggered by at least one of: the L1 measurement report, or the L3 measurement report.

At block 1502, the network entity may transmit the SSB in the SSB resources as a beamformed SSB. For example, the SSB and SSB burst set transmission circuitry 1443, as shown and described in connection with FIG. 14, may provide a means for transmitting the SSB in the SSB resources as a beamformed SSB.

Figure 16:
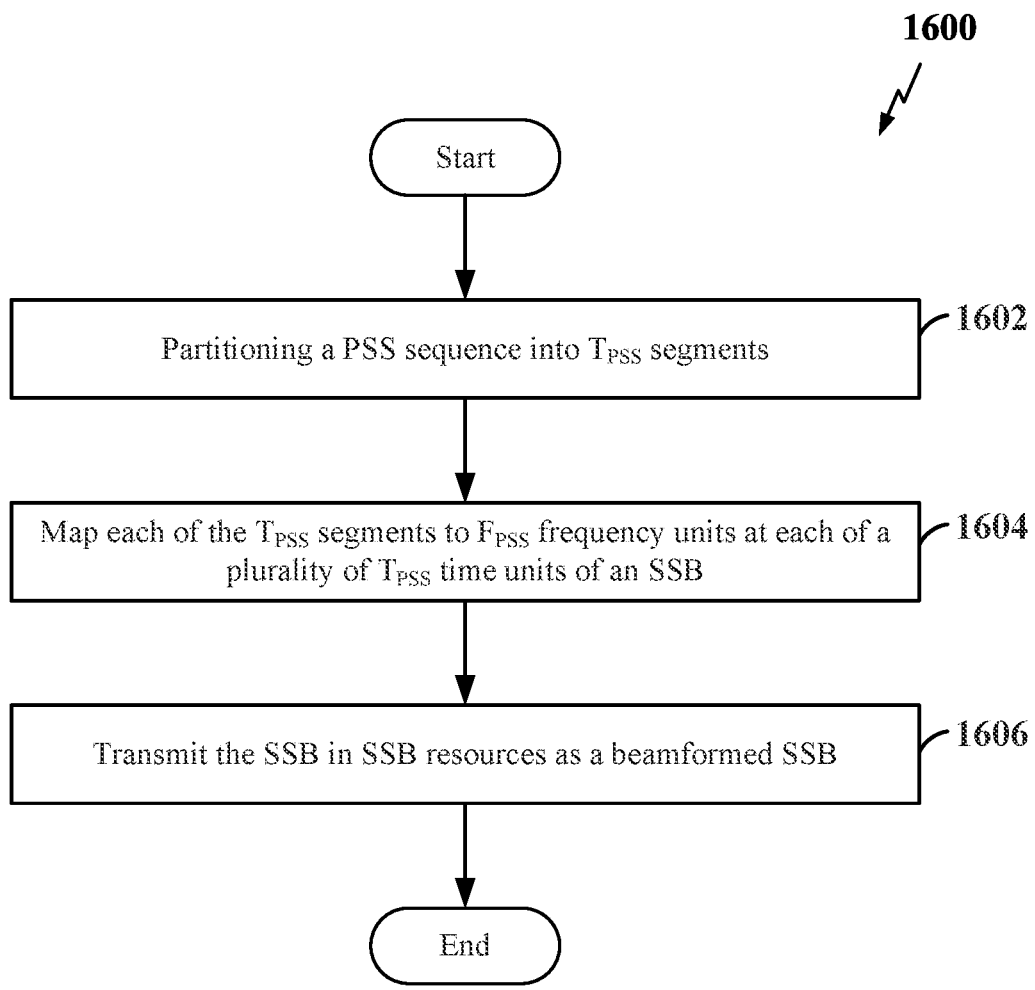
FIG. 16 is a flow chart illustrating an example process of wireless communication at a network entity in accordance with some aspects of the disclosure.

FIG. 16 is a flow chart illustrating an example process 1600 (e.g., a method) of wireless communication at a network entity in accordance with some aspects of the disclosure. As described below, some or all illustrated features may be omitted in a particular implementation within the scope of the present disclosure, and some illustrated features may not be required for implementation of all embodiments. In some examples, the process 1600 may be carried out by the network entity 1400, as illustrated and described in connection with FIG. 14. The network entity 1400 may be similar to, for example, any of the scheduling entities of FIGS. 1, 2, and/or 3. In some examples, the process 1600 may be carried out by any suitable apparatus or means for carrying out the functions or algorithm described below.

At block 1602, the network entity may partition a PSS sequence into $T_{PSS}$ segments. For example, the PSS sequence circuitry 1445, as shown and described in connection with FIG. 14, may provide a means for partitioning a PSS sequence into $T_{PSS}$ segments.

According to some aspects, each of the $T_{PSS}$ segments may be associated with a respective base sequence of length $L_{PSS}$, and $L_{PSS}$ may be greater than one and less than or equal to $k*F_{PSS}$, k being a constant equal to a quantity of resource elements per frequency unit expressed in units of resource elements (REs), RE groups, physical resource blocks (PRBs), or PRB groups.

According to some aspects, each of the $T_{PSS}$ segments may be associated with a respective base sequence, the respective base sequence may be cell-specific or zone-specific, and the respective base sequence may be mutually orthogonal or quasi-orthogonal with respect to all other ones of the respective base sequences in a time domain, a frequency domain, or both the time and the frequency domain.

According to some aspects, each of the $T_{PSS}$ segments may be associated with a respective base sequence, and the respective base sequence may be configurable to be padded with zeros or extended cyclically to a length equal to $k*F_{PSS}$, k being a constant equal to a quantity of resource elements per frequency unit expressed in units of resource elements (REs), RE groups, physical resource blocks (PRBs), or PRB groups.

At block 1604, the network entity may map each of the $T_{PSS}$ segments to $F_{PSS}$ frequency units at each of a plurality of $T_{PSS}$ time units of an SSB. For example, the PSS sequence circuitry 1445, as shown and described in connection with FIG. 14, may provide a means for mapping each of the $T_{PSS}$ segments to $F_{PSS}$ frequency units at each of a plurality of $T_{PSS}$ time units of an SSB.

At block 1606, the network entity may transmit the SSB in SSB resources as a beamformed SSB. The SSB resources may be described, for example, in connection with the process 1500, as shown and described in connection with FIG. 15. For example, the SSB and SSB burst set transmission circuitry 1443, as shown and described in connection with FIG. 14, may provide a means for transmitting the SSB in SSB resources as a beamformed SSB.

Figure 17:
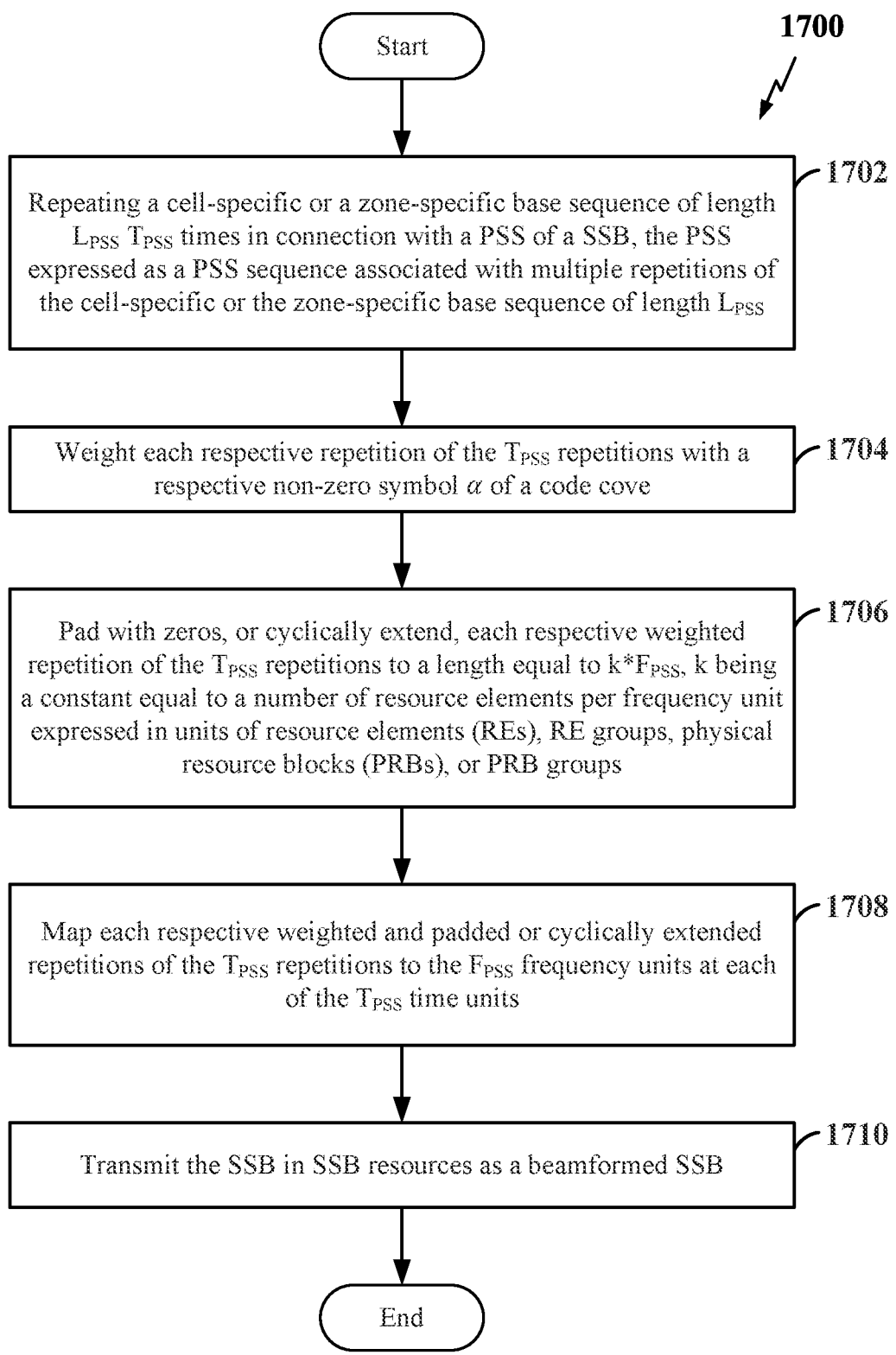
FIG. 17 is a flow chart illustrating an example process of wireless communication at a network entity in accordance with some aspects of the disclosure.

FIG. 17 is a flow chart illustrating an example process 1700 (e.g., a method) of wireless communication at a network entity in accordance with some aspects of the disclosure. As described below, some or all illustrated features may be omitted in a particular implementation within the scope of the present disclosure, and some illustrated features may not be required for implementation of all embodiments. In some examples, the process 1700 may be carried out by the network entity 1400, as illustrated and described in connection with FIG. 14. The network entity 1400 may be similar to, for example, any of the scheduling entities of FIGS. 1, 2, and/or 3. In some examples, the process 1700 may be carried out by any suitable apparatus or means for carrying out the functions or algorithm described below.

At block 1702, in connection with a PSS of an SSB, the PSS expressed as a PSS sequence associated with multiple repetitions of a cell-specific or zone-specific base sequence of length $L_{PSS}$, repeating the cell-specific or zone-specific base sequence of length $L_{PSS}$ $T_{PSS}$ times. For example, the PSS sequence circuitry 1445, as shown and described in connection tth FIG. 14, may provide a means for repeating the cell-specific or zone-specific base sequence of length $L_{PSS}$ $T_{PSS}$ times (in connection with a PSS expressed as a PSS sequence associated with multiple repetitions of a cell-specific or zone-specific base sequence of length $L_{PSS}$).

At block 1704, the network entity may weight each respective repetition of the $T_{PSS}$ repetitions with a respective non-zero symbol α of a code cover. For example, the PSS sequence circuitry 1445, as shown and described in connection with FIG. 14, may provide a means for weighting each respective repetition of the $T_{PSS}$ repetitions with a respective non-zero symbol α of a code cover.

At block 1706, the network entity may pad with zeros, or cyclically extend each respective weighted repetition of the $T_{PSS}$ repetitions to a length equal to $k*F_{PSS}$, k being a constant equal to a quantity of resource elements per frequency unit expressed in units of resource elements (REs), RE groups, physical resource blocks (PRBs), or PRB groups. For example, the PSS sequence circuitry 1445, as shown and described in connection with FIG. 14, may provide a means for padding with zeros or cyclically extending each respective weighted repetition of the $T_{PSS}$ repetitions to a length equal to $k*F_{PSS}$, k being a constant equal to a quantity of resource elements per frequency unit expressed in units of resource elements (REs), RE groups, physical resource blocks (PRBs), or PRB groups.

At block 1708, the scheduled entity may map each respective weighted and padded or cyclically extended $T_{PSS}$ repetition to the $F_{PSS}$ frequency units at each $T_{PSS}$ time unit. For example, the PSS sequence circuitry 1445, as shown and described in connection with FIG. 14, may provide a means for mapping each respective weighted and padded or cyclically extended repetitions of the $T_{PSS}$ repetitions to the $F_{PSS}$ frequency units at each of the $T_{PSS}$ time units.

At block 1710, the network entity may transmit the SSB in SSB resources as a beamformed SSB. The SSB resources may be described, for example, in connection with the process 1500, as shown and described in connection with FIG. 15. For example, the SSB and SSB burst set transmission circuitry 1443, as shown and described in connection with FIG. 14, may provide a means for transmitting the SSB in SSB resources as a beamformed SSB.

Figure 18:
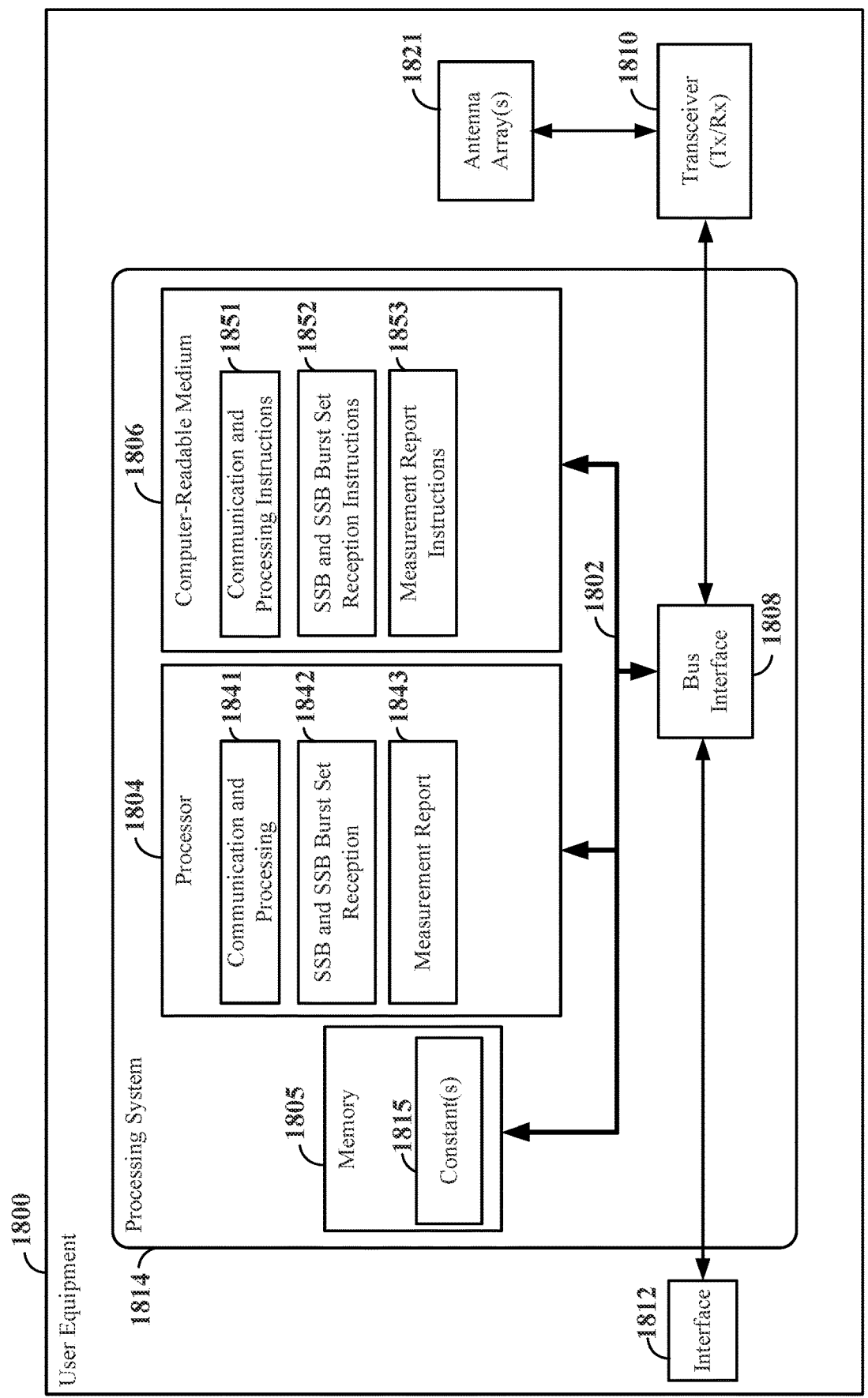
FIG. 18 is a block diagram illustrating an example of a hardware implementation of a user equipment employing one or more processing systems according to some aspects of the disclosure.

FIG. 18 is a block diagram illustrating an example of a hardware implementation of a user equipment (UE) 1800 (e.g., a scheduled entity, a sidelink UE) employing one or more processing systems (generally represented by processing system 1814) according to some aspects of the disclosure. The UE 1800 may be similar to, for example, any of the UEs of FIGS. 1, 2, and/or 3.

The processing system 1814 may be substantially the same as the processing system 1414 illustrated in FIG. 14, including a bus interface 1808, a bus 1802, one or more memories, such as memory 1805, one or more processors, such as processor 1804, and one or more computer-readable mediums, such as computer-readable medium 1806, and a user interface, such as user interface 1812.

In accordance with various aspects of the disclosure, an element, or any portion of an element, or any combination of elements may be implemented with a processing system 1814 that includes one or more processors, generally represented by processor 1804. The one or more processors (generally represented by processor 1804), as utilized in the UE 1800, may be configured to, individually or collectively, implement any one or more of the methods or processes described herein and illustrated, for example, in FIGS. 7, 8A, 8B, 9, 10A, 10B, 11, 12, and/or 13.

In some aspects of the disclosure, the processor 1804 may include communication and processing circuitry 1841 configured for various functions, including, for example, communicating with a network entity (e.g., a base station, an aggregated or disaggregated base station, a gNB, a TRP, a scheduling entity, a SynchRef sidelink UE). In some examples, the communication and processing circuitry 1841 may include one or more hardware components that provide the physical structure that performs processes related to communication (e.g., data reception and/or data transmission) and signal processing (e.g., processing received data and/or processing data for transmission). The communication and processing circuitry 1841 may further be configured to execute communication and processing instructions 1851 (e.g., software) stored on the computer-readable medium 1806 to implement one or more functions described herein.

In some aspects of the disclosure, the processor 1804 may include synchronization signal block (SSB) and SSB burst set reception circuitry 1842 configured for various functions, including, for example, receiving, from a network entity, an SSB conveying a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels, where a product of the first configured integer number and the second configured integer number is a predetermined constant value, each symbol of the SSB has an equal number of resource elements (REs), and all REs in the each symbol of the SSB, except REs within a first frequency guard band between any two of the PSS, the SSS, and the PBCH in the each symbol of the SSB, have non-zero values.

In some examples, the SSB may be received via a Uu reference point or a PC5 reference point. In some examples, the first configured integer number of time units is expressed in units of symbols, mini-slots, or sub-slots. In some examples, the second configured integer number of physical channels is expressed in units of resource elements (REs), RE groups, physical resource blocks (PRBs), or PRB groups. In some examples, a first time duration of the PSS is less than or equal to a total time duration of the SSB. In some examples, within the SSB, the PSS is multiplexed with the SSS and the PBCH in time, frequency, or both time and frequency.

In some examples, the SSB is a first SSB of one of a plurality of SSBs in an SSB burst, and the SSB and SSB burst set reception circuitry 1842 may further be configured to locate a first symbol of the first SSB at an nth symbol of a slot, where n is an integer that is greater than or equal to two and less than or equal to a total number of time units in the first SSB.

In some examples, the SSB and SSB burst set reception circuitry 1842 may be configured to receive, on an active downlink bandwidth part (DL BWP) the SSB including the PSS, the SSS, and a portion of the PBCH, utilize the PSS for at least one of: synchronization, phase noise mitigation, or tracking loop maintenance, and utilize the SSS for at least one of: L1 measurements, L3 measurements, channel estimation, synchronization, tracking loop maintenance, or phase noise estimation.

In some examples, the SSB and SSB burst set reception circuitry 1842 may be configured to receive, on an active downlink bandwidth part (DL BWP) the SSB including the SSS, the PBCH, and a portion of the PSS, and utilize the SSS and the PBCH for at least one of: L1 measurements, L3 measurements, channel estimation, synchronization, tracking loop maintenance, or phase noise estimation.

In some examples, the SSB and SSB burst set reception circuitry 1842 may be configured to conduct, at a beginning of a cell search, a fast frequency scan based on the PSS, and perform correlation in at least one of: a time domain or a frequency domain utilizing a first sampling rate that is proportional to a first bandwidth of the PSS, as distinct from utilizing a second sampling rate that is proportional to a second bandwidth corresponding to an entire bandwidth of the SSB.

The SSB and SSB burst set reception circuitry 1842 may further be configured to execute SSB and SSB burst set instructions 1852 (e.g., software) stored on the computer-readable medium 1806 to implement one or more functions described herein.

In some aspects of the disclosure, the processor 1804 may include measurement report circuitry 1843 configured for various functions, including, for example, transmitting, to the network entity, at least one of: a layer 1 (L1) measurement report, or a layer 3 (L3) measurement report based on measurements of SSB reference signals (SSB-RSs) within the SSB resource area. In some examples, the measurement report circuitry 1843 may also be configured to initiate an inter-cell or an inter-TRP mobility procedure triggered by at least one of: the L1 measurement report, or the L3 measurement report.

In some examples, the measurement report circuitry 1843 may be configured to receive, from a network entity, a neighbor SSB measurement timing configuration (SMTC) data based on a configured neighbor SSB resource area, each symbol in the configured neighbor SSB resource area having an equal number of resource elements (REs), and all REs in each symbol in the configured neighbor SSB resource area, except REs within a second frequency guard band between any two of a neighbor PSS, a neighbor SSS, and a neighbor PBCH in the configured neighbor SSB resource area, have non-zero values, measure SSB reference signals (SSB-RSs) of SSBs located using the SMTC data, and transmit, to the network entity, at least one of: a layer 1 (L1) measurement report, or a layer 3 (L3) measurement report based on the measured SSB-RSs within the configured neighbor SSB resource area. In some examples, the neighbor is a neighbor cell or a neighbor transmission reception point (TRP) serving the UE, and the measurement report circuitry 1843 is further configured to initiate an inter-cell or an inter-TRP mobility procedure, respectively, triggered by at least one of: the L1 measurement report, or the L3 measurement report.

The measurement report circuitry 1843 may further be configured to execute measurement report instructions 1853 (e.g., software) stored on the computer-readable medium 1806 to implement one or more functions described herein.

In general, a UE, such as the UE 1800, may include one or more memories (e.g., represented by memory 1805), and one or more processors (e.g., represented by processor 1804) being configured to, based at least in part on information stored in the one or more memories: perform any of the processes described herein. For example, the memory 1805 may store one or more constants 1815 (e.g., the constant k) that may be used in connection with verification of configurations of SSB(s) or PSS sequences.

Figure 19:
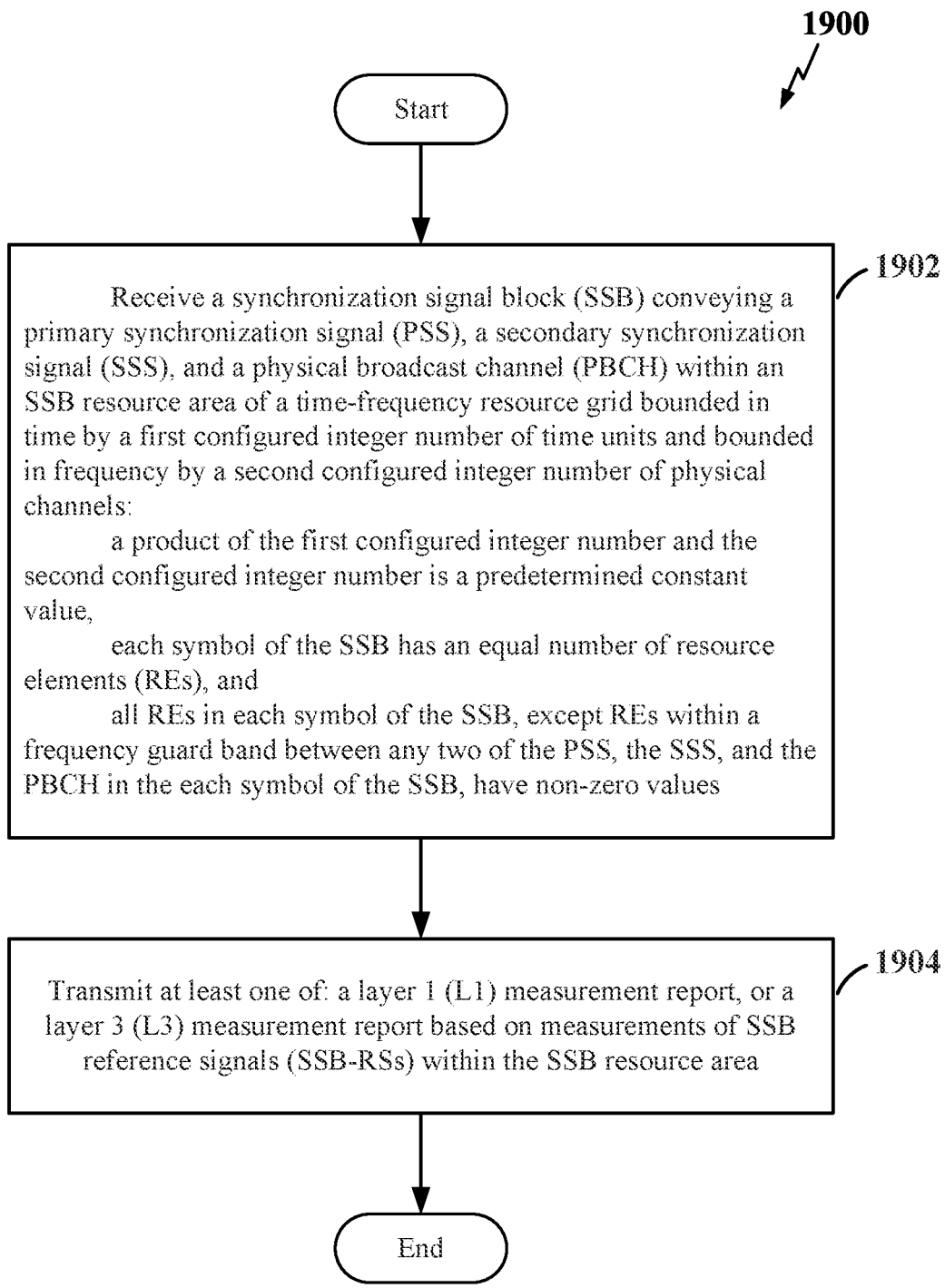
FIG. 19 is a flow chart illustrating an example process of wireless communication at a user equipment according to some aspects of the disclosure.

FIG. 19 is a flow chart illustrating an example process 1900 (e.g., a method) of wireless communication at a user equipment (UE) according to some aspects of the disclosure. As described below, some or all illustrated features may be omitted in a particular implementation within the scope of the present disclosure, and some illustrated features may not be required for implementation of all embodiments. In some examples, the process 1900 may be carried out by the UE 1800 as illustrated and described in connection with FIG. 18. The UE 1800 may be similar to, for example, any of the UEs or scheduled entities or sidelink UEs as shown and described in connection with FIGS. 1, 2, and/or 3. In some examples, the process 1900 may be carried out by any suitable apparatus or means for carrying out the functions or algorithm described below.

At block 1902, the UE may receive an SSB conveying a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels, where a product of the first configured integer number and the second configured integer number is a predetermined constant value, each symbol of the SSB has an equal number of resource elements (REs), and all REs in the each symbol of the SSB, except REs within a first frequency guard band between any two of the PSS, the SSS, and the PBCH in the each symbol of the SSB, have non-zero values. The UE may receive the SSB from a network entity.

In some examples, the SSB may be received via a Uu reference point or a PC5 reference point. In some examples, the first configured integer number of time units is expressed in units of symbols, mini-slots, or sub-slots. In some examples, the second configured integer number of physical channels is expressed in units of resource elements (REs), RE groups, physical resource blocks (PRBs), or PRB groups. In some examples, a first time duration of the PSS is less than or equal to a total time duration of the SSB. In some examples, within the SSB, the PSS is multiplexed with the SSS and the PBCH in time, frequency, or both time and frequency.

In some examples, the SSB is a first SSB of one of a plurality of SSBs in an SSB burst, and the process 1900 may include locating a first symbol of the first SSB at an nth symbol of a slot, where n is an integer that is greater than or equal to two and less than or equal to a total number of time units in the first SSB. For example, the communication and processing circuitry 1841, as shown and described in connection with FIG. 18, may provide a means for locating a first symbol of the first SSB at an nth symbol of a slot, where n is an integer that is greater than or equal to two and less than or equal to a total number of time units in the first SSB in examples where the SSB is a first SSB of one of a plurality of SSBs in an SSB burst.

In some examples, the UE may receive, on an active downlink bandwidth part (DL BWP), the SSB, including the PSS, the SSS, and a portion of the PBCH, and may utilize the PSS for at least one of: synchronization, phase noise mitigation, or tracking loop maintenance, and utilize the SSS for at least one of: L1 measurements, L3 measurements, channel estimation, synchronization, tracking loop maintenance, or phase noise estimation. For example, the communication and processing circuitry 1841, as shown and described in connection with FIG. 18, may provide a means for receiving, on an active downlink bandwidth part (DL BWP), the SSB including the PSS, the SSS, and a portion of the PBCH, and utilizing the PSS for at least one of: synchronization, phase noise mitigation, or tracking loop maintenance, and utilize the SSS for at least one of: L1 measurements, L3 measurements, channel estimation, synchronization, tracking loop maintenance, or phase noise estimation.

In some examples, the UE may receive, on an active downlink bandwidth part (DL BWP), the SSB, including the SSS, the PBCH, and a portion of the PSS, and may utilize the SSS and the PBCH for at least one of: L1 measurements, L3 measurements, channel estimation, synchronization, tracking loop maintenance, or phase noise estimation. For example, the communication and processing circuitry 1841, as shown and described in connection with FIG. 18, may provide a means for receiving, on an active downlink bandwidth part (DL BWP) the SSB including the SSS, the PBCH, and a portion of the PSS, and utilizing the SSS and the PBCH for at least one of: L1 measurements, L3 measurements, channel estimation, synchronization, tracking loop maintenance, or phase noise estimation.

In some examples, the UE may conduct, at a beginning of a cell search, a fast frequency scan based on the PSS, and may perform correlation in at least one of: a time domain or a frequency domain utilizing a first sampling rate that is proportional to a first bandwidth of the PSS, as distinct from utilizing a second sampling rate that is proportional to a second bandwidth corresponding to an entire bandwidth of the SSB. For example, the communication and processing circuitry 1841, as shown and described in connection with FIG. 18, may provide a means for conducting, at a beginning of a cell search, a fast frequency scan based on the PSS, and performing correlation in at least one of: a time domain or a frequency domain utilizing a first sampling rate that is proportional to a first bandwidth of the PSS, as distinct from utilizing a second sampling rate that is proportional to a second bandwidth corresponding to an entire bandwidth of the SSB.

At block 1904, the UE may transmit at least one of: a layer 1 (L1) measurement report, or a layer 3 (L3) measurement report based on measurements of SSB reference signals (SSB-RSs) within the SSB resource area. The transmission may be directed to a network entity. For example, the measurement report circuitry 1843, as shown and described in connection with FIG. 18, may provide a means for transmitting at least one of: a layer 1 (L1) measurement report, or a layer 3 (L3) measurement report based on measurements of SSB reference signals (SSB-RSs) within the SSB resource area.

In some examples, the UE may initiate an inter-cell or an inter-TRP mobility procedure triggered by at least one of: the L1 measurement report, or the L3 measurement report. For example, the communication and processing circuitry 1841, as shown and described in connection with FIG. 18, may provide a means for initiating an inter-cell or an inter-TRP mobility procedure triggered by at least one of: the L1 measurement report, or the L3 measurement report.

Figure 20:
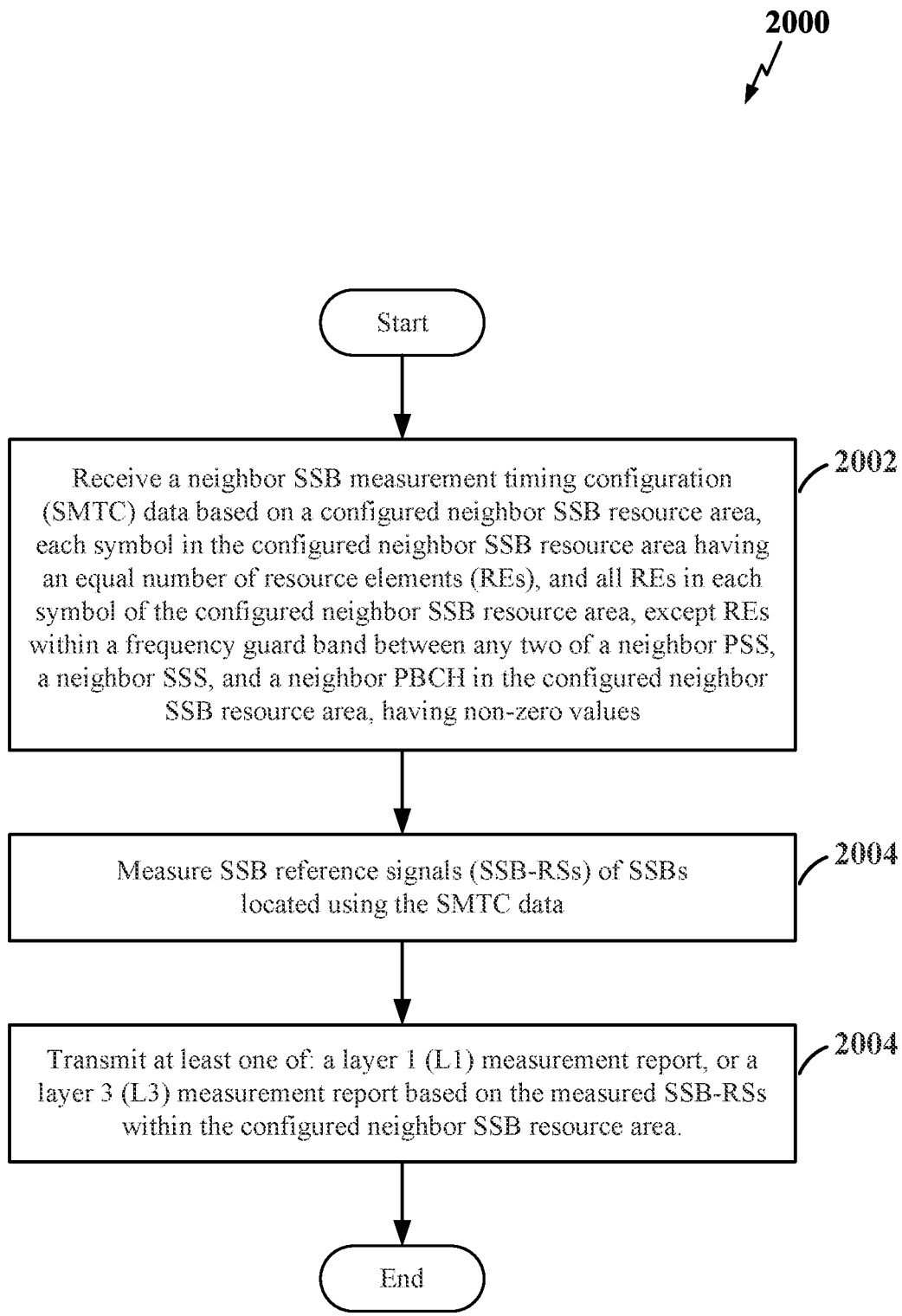
FIG. 20 is a flow chart illustrating an example process of wireless communication at a user equipment according to some aspects of the disclosure.

FIG. 20 is a flow chart illustrating an example process 2000 (e.g., a method) of wireless communication at a user equipment (UE) according to some aspects of the disclosure. As described below, some or all illustrated features may be omitted in a particular implementation within the scope of the present disclosure, and some illustrated features may not be required for implementation of all embodiments. In some examples, the process 2000 may be carried out by the UE 1800 as illustrated and described in connection with FIG. 18. The UE 1800 may be similar to, for example, any of the UEs or scheduled entities or sidelink UEs as shown and described in connection with FIGS. 1, 2, and/or 3. In some examples, the process 2000 may be carried out by any suitable apparatus or means for carrying out the functions or algorithm described below.

At block 1902, the UE may receive a neighbor SSB measurement timing configuration (SMTC) data based on a configured neighbor SSB resource area, each symbol in the configured neighbor SSB resource area having an equal number of resource elements (REs), and all REs in each symbol in the configured neighbor SSB resource area, except REs within a second frequency guard band between any two of a neighbor PSS, a neighbor SSS, and a neighbor PBCH in the configured neighbor SSB resource area, have non-zero values. For example, the communication and processing circuitry 1841, as shown and described in connection with FIG. 18, may provide a means for receiving a neighbor SSB measurement timing configuration (SMTC) data based on a configured neighbor SSB resource area, each symbol in the configured neighbor SSB resource area having an equal number of resource elements (REs), and all REs in each symbol in the configured neighbor SSB resource area, except REs within a second frequency guard band between any two of a neighbor PSS, a neighbor SSS, and a neighbor PBCH in the configured neighbor SSB resource area, have non-zero values. The SMTC data may be received from a network entity. The SMTC data may be received from a serving base station of the UE.

At block 2004, the UE may measure SSB reference signals (SSB-RSs) of SSBs located using the SMTC data. For example, the communication and processing circuitry 1841, as shown and described in connection with FIG. 18, may provide a means for measuring SSB reference signals (SSB-RSs) of SSBs located using the SMTC data.

At block 2006, the UE may transmit at least one of: a layer 1 (L1) measurement report, or a layer 3 (L3) measurement report based on the measured SSB-RSs within the configured neighbor SSB resource area.

Of course, in the above examples, the circuitry included in the processor 1404 of FIG. 14 and/or the processor 1804 of FIG. 18 is merely provided as an example. Other means for carrying out the described processes or functions may be included within various aspects of the present disclosure, including but not limited to the instructions stored in the computer-readable medium 1406 of FIG. 14 and/or the computer-readable medium 1806 of FIG. 18 or any other suitable apparatus or means described in any one of the FIGS. 1, 2, 3, 14, and/or 18 utilizing, for example, the processes and/or algorithms described herein in relation to FIGS. 7, 8A, 8B, 9, 10A, 10B, 11, 12, 13, 15, 16, 17, 19, and/or 20.

The following provides an overview of aspects of the present disclosure:

Aspect 1: A method, at a network entity, comprising: configuring a synchronization signal block (SSB) using SSB resources that convey a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels, wherein: a product of the first configured integer number and the second configured integer number is a predetermined constant value, each symbol of the SSB has an equal number of resource elements (REs), and all REs in the each symbol of the SSB, except REs within a first frequency guard band between any two of the PSS, the SSS, and the PBCH in the each symbol of the SSB, have non-zero values; and transmitting the SSB in the SSB resources as a beamformed SSB.

Aspect 2: The method of aspect 1, wherein a first time duration of the PSS is equal to a total time duration of the SSB.

Aspect 3: The method of aspect 1 or 2, wherein within the SSB, the PSS is multiplexed with the SSS and the PBCH in time or in time and frequency.

Aspect 4: The method of any of aspects 1 through 3, wherein the SSB is a first SSB of a plurality of SSBs in an SSB burst set, the method further comprising: mapping a first symbol of the first SSB to an nth symbol of a slot, where n is an integer that is greater than or equal to two and less than or equal to a total number of time units in the first SSB.

Aspect 5: The method of any of aspects 1 through 4, further comprising: obtaining a neighbor SSB measurement timing configuration (SMTC) data based on a configured neighbor SSB resource area, each symbol in the configured neighbor SSB resource area having an equal number of resource elements (REs), and all REs in each symbol in the configured neighbor SSB resource area, except REs within a second frequency guard band between any two of a neighbor PSS, a neighbor SSS, and a neighbor PBCH in the configured neighbor SSB resource area, have non-zero values; transmitting, to at least one user equipment (UE), the neighbor SMTC data; and receiving, from the at least one UE, at least one of: a layer 1 (L1) measurement report, or a layer 3 (L3) measurement report based on measured SSB reference signals (SSB-RSs) within the configured neighbor SSB resource area.

Aspect 6: The method of any of aspects 1 through 5, wherein the PSS spans TPSS time units, TPSS is greater than one, the PSS occupies FPSS frequency units, and the PSS is expressed as a PSS sequence, the method further comprising: partitioning the PSS sequence into TPSS segments; and mapping each of the TPSS segments to the FPSS frequency units at each of the TPSS time units.

Aspect 7: The method of aspect 6, wherein: each of the TPSS segments is associated with a respective base sequence of length LPSS, and LPSS is greater than one and less than or equal to k*FPSS, k being a constant equal to a quantity of resource elements per frequency unit expressed in units of resource elements (REs), RE groups, physical resource blocks (PRBs), or PRB groups.

Aspect 8: The method of aspect 6, wherein: each of the TPSS segments is associated with a respective base sequence, and the respective base sequence is configurable to be padded with zeros, or extended cyclically, to a length equal to k*FPSS, k being a constant equal to a quantity of resource elements per frequency unit expressed in units of resource elements (REs), RE groups, physical resource blocks (PRBs), or PRB groups.

Aspect 9: The method of any of aspects 1 through 8, wherein the PSS spans TPSS time units, TPSS is greater than one, the PSS occupies FPSS frequency units, and the PSS is expressed as a PSS sequence associated with a cell-specific or zone-specific base sequence of length MPSS, the cell-specific or zone-specific base sequence of length MPSS is configurable to be padded with zeros, or cyclically extended, to a length equal to TPSS*k*FPSS, k being a constant equal to a quantity of resource elements per frequency unit expressed in units of resource elements (REs), RE groups, physical resource blocks (PRBs), or PRB groups, the method further comprising: partitioning the base sequence of length MPSS uniformly into TPSS segments; and mapping each of the TPSS segments to the FPSS frequency units at each of the TPSS time units.

Aspect 10: The method of any of aspects 1 through 9, wherein the PSS spans TPSS time units, TPSS is greater than one, the PSS occupies FPSS frequency units, and the PSS is expressed as a PSS sequence associated with multiple repetitions of a cell-specific or zone-specific base sequence of length LPSS, the method further comprising: repeating the cell-specific or zone-specific base sequence of length LPSS TPSS times; weighting each respective repetition of the TPSS repetitions with a respective non-zero symbol α of a code cover; padding with zeros, or cyclically extending, each respective weighted repetition of the TPSS repetitions to a length equal to k*FPSS, k being a constant equal to a quantity of resource elements per frequency unit expressed in units of resource elements (REs), RE groups, physical resource blocks (PRBs), or PRB groups; and mapping each respective weighted and padded or cyclically extended repetitions of the TPSS repetitions to the FPSS frequency units at each of the TPSS time units.

Aspect 11: A network entity, comprising: one or more memories; and one or more processors being configured to, individually or collectively, based at least in part on information stored in the one or more memories: configure a synchronization signal block (SSB) using SSB resources that convey a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels, wherein: a product of the first configured integer number and the second configured integer number is a predetermined constant value, each symbol of the SSB has an equal number of resource elements (REs), and all REs in the each symbol of the SSB, except REs within a first frequency guard band between any two of the PSS, the SSS, and the PBCH in the each symbol of the SSB, have non-zero values; and transmit the SSB in the SSB resources as a beamformed SSB.

Aspect 12: The network entity of aspect 11, wherein a first time duration of the PSS is equal to a total time duration of the SSB.

Aspect 13: The network entity of aspect 11 or 12, wherein within the SSB, the PSS is multiplexed with the SSS and the PBCH in time or in time and frequency.

Aspect 14: The network entity of any of aspects 11 through 13, wherein the SSB is a first SSB of a plurality of SSBs in an SSB burst set, the one or more processors being further configured to: map a first symbol of the first SSB to an nth symbol of a slot, where n is an integer that is greater than or equal to two and less than or equal to a total number of time units in the first SSB.

Aspect 15: The network entity of any of aspects 11 through 14, the one or more processors being further configured to: obtain a neighbor SSB measurement timing configuration (SMTC) data based on a configured neighbor SSB resource area, each symbol in the configured neighbor SSB resource area having an equal number of resource elements (REs), and all REs in each symbol in the configured neighbor SSB resource area, except REs within a second frequency guard band between any two of a neighbor PSS, a neighbor SSS, and a neighbor PBCH in the configured neighbor SSB resource area, have non-zero values; transmit, to at least one user equipment (UE), the neighbor SMTC data; and receive, from the at least one UE, at least one of: a layer 1 (L1) measurement report, or a layer 3 (L3) measurement report based on measured SSB reference signals (SSB-RSs) within the configured neighbor SSB resource area.

Aspect 16: The network entity of any of aspects 11 through 15, wherein the PSS spans TPSS time units, TPSS is greater than one, the PSS occupies FPSS frequency units, and the PSS is expressed as a PSS sequence, the one or more processors being further configured to: partition the PSS sequence into TPSS segments; and map each of the TPSS segments to the FPSS frequency units at each of the TPSS time units.

Aspect 17: The network entity of aspect 16, wherein: each of the TPSS segments is associated with a respective base sequence of length LPSS, and LPSS is greater than one and less than or equal to k*FPSS, k being a constant equal to a quantity of resource elements per frequency unit expressed in units of resource elements (REs), RE groups, physical resource blocks (PRBs), or PRB groups.

Aspect 18: The network entity of aspect 16, wherein: each of the TPSS segments is associated with a respective base sequence, and the respective base sequence is configurable to be padded with zeros, or extended cyclically, to a length equal to k*FPSS, k being a constant equal to a quantity of resource elements per frequency unit expressed in units of resource elements (REs), RE groups, physical resource blocks (PRBs), or PRB groups.

Aspect 19: The network entity of any of aspects 11 through 18, wherein the PSS spans TPSS time units, TPSS is greater than one, the PSS occupies FPSS frequency units, and the PSS is expressed as a PSS sequence associated with a cell-specific or zone-specific base sequence of length MPSS, the cell-specific or zone-specific base sequence of length MPSS is configurable to be padded with zeros, or cyclically extended, to a length equal to TPSS*k*FPSS, k being a constant equal to a quantity of resource elements per frequency unit expressed in units of resource elements (REs), RE groups, physical resource blocks (PRBs), or PRB groups, the one or more processors being further configured to: partition the base sequence of length MPSS uniformly into TPSS segments; and map each of the TPSS segments to the FPSS frequency units at each of the TPSS time units.

Aspect 20: The network entity of any of aspects 11 through 18, wherein the PSS spans TPSS time units, TPSS is greater than one, the PSS occupies FPSS frequency units, and the PSS is expressed as a PSS sequence associated with multiple repetitions of a cell-specific or zone-specific base sequence of length LPSS, the one or more processors being further configured to: repeat the cell-specific or zone-specific base sequence of length LPSS TPSS times; weight each respective repetition of the TPSS repetitions with a respective non-zero symbol α of a code cover; pad with zeros, or cyclically extend, each respective weighted repetition of the TPSS repetitions to a length equal to k*FPSS, k being a constant equal to a quantity of resource elements per frequency unit expressed in units of resource elements (REs), RE groups, physical resource blocks (PRBs), or PRB groups; and map each respective weighted and padded or cyclically extended repetitions of the TPSS repetitions to the FPSS frequency units at each of the TPSS time units.

Aspect 21: A method, at a user equipment, comprising: receiving, from a network entity, a synchronization signal block (SSB) conveying a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels, wherein: a product of the first configured integer number and the second configured integer number is a predetermined constant value, each symbol of the SSB has an equal number of resource elements (REs), and all REs in the each symbol of the SSB, except REs within a first frequency guard band between any two of the PSS, the SSS, and the PBCH in the each symbol of the SSB, have non-zero values; and transmitting, to the network entity, at least one of: a layer 1 (L1) measurement report, or a layer 3 (L3) measurement report based on measurements of SSB reference signals (SSB-RSs) within the SSB resource area.

Aspect 22: The method of aspect 21, wherein a first time duration of the PSS is less than or equal to a total time duration of the SSB.

Aspect 23: The method of aspect 21 or 22, wherein within the SSB, the PSS is multiplexed with the SSS and the PBCH in time, or time and frequency.

Aspect 24: The method of any of aspects 21 through 23, wherein the SSB is a first SSB of one of a plurality of SSBs in an SSB burst, the method further comprising: locating a first symbol of the first SSB at an nth symbol of a slot, where n is an integer that is greater than or equal to two and less than or equal to a total number of time units in the first SSB.

Aspect 25: The method of any of aspects 21 through 24, further comprising: receiving, from the network entity, a neighbor SSB measurement timing configuration (SMTC) data based on a configured neighbor SSB resource area, each symbol in the configured neighbor SSB resource area having an equal number of resource elements (REs), and all REs in each symbol in the configured neighbor SSB resource area, except REs within a second frequency guard band between any two of a neighbor PSS, a neighbor SSS, and a neighbor PBCH in the configured neighbor SSB resource area, have non-zero values; measuring SSB reference signals (SSB-RSs) of SSBs located using the SMTC data; and transmitting, to the network entity, at least one of: a layer 1 (L1) measurement report, or a layer 3 (L3) measurement report based on the measured SSB-RSs within the configured neighbor SSB resource area.

Aspect 26: A user equipment, comprising: one or more memories; and one or more processors being configured to, individually or collectively, based at least in part on information stored in the one or memories: receive from a network entity, a synchronization signal block (SSB) conveying a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels, wherein: a product of the first configured integer number and the second configured integer number is a predetermined constant value, each symbol of the SSB has an equal number of resource elements (REs), and all REs in the each symbol of the SSB, except REs within a first frequency guard band between any two of the PSS, the SSS, and the PBCH in the each symbol of the SSB, have non-zero values; and transmit, to the network entity, at least one of: a layer 1 (L1) measurement report, or a layer 3 (L3) measurement report based on measurements of SSB reference signals (SSB-RSs) within the SSB resource area.

Aspect 27: The user equipment of aspect 26, wherein a first time duration of the PSS is less than or equal to a total time duration of the SSB.

Aspect 28: The user equipment of aspect 26 or 27, wherein within the SSB, the PSS is multiplexed with the SSS and the PBCH in time, or time and frequency.

Aspect 29: The user equipment of any of aspects 26 through 28, wherein the SSB is a first SSB of one of a plurality of SSBs in an SSB burst, the one or more processors being further configured to: locate a first symbol of the first SSB at an nth symbol of a slot, where n is an integer that is greater than or equal to two and less than or equal to a total number of time units in the first SSB.

Aspect 30: The user equipment of any of aspects 26 through 29, the one or more processors being further configured to: receive, from the network entity, a neighbor SSB measurement timing configuration (SMTC) data based on a configured neighbor SSB resource area, each symbol in the configured neighbor SSB resource area having an equal number of resource elements (REs), and all REs in each symbol in the configured neighbor SSB resource area, except REs within a second frequency guard band between any two of a neighbor PSS, a neighbor SSS, and a neighbor PBCH in the configured neighbor SSB resource area, have non-zero values; measure SSB reference signals (SSB-RSs) of SSBs located using the SMTC data; and transmit, to the network entity, at least one of: a layer 1 (L1) measurement report, or a layer 3 (L3) measurement report based on the measured SSB-RSs within the configured neighbor SSB resource area.

Aspect 31: An apparatus configured for wireless communication comprising at least one means for performing a method of any one of aspects 1 through 10 or 21 through 25.

Aspect 32: A non-transitory computer-readable medium storing computer-executable code, comprising code for causing an apparatus to perform a method of any one of aspects 1 through 10 or 21 through 25.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-20 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein. While some examples illustrated herein depict only time and frequency domains, additional domains such as a spatial domain are also contemplated in this disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

The word "obtain" as used herein may mean, for example, acquire, calculate, construct, derive, determine, receive, and/or retrieve. The preceding list is exemplary and not limiting. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

As used herein, the term "determine" or "determining" encompasses a wide variety of actions and, therefore, "determining" can include calculating, computing, processing, deriving, investigating, looking up (such as via looking up in a table, a database, or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing, and other similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Similarly, a phrase referring to A and/or B may include A only, B only, or a combination of A and B.

As used herein, "based on" is intended to be interpreted in the inclusive sense, unless otherwise explicitly indicated. For example, "based on" may be used interchangeably with "based at least in part on," "associated with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A method, at a network entity, comprising:
configuring a synchronization signal block (SSB) using SSB resources that convey a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels, wherein:
a product of the first configured integer number and the second configured integer number is a predetermined constant value,
each symbol of the SSB has an equal number of resource elements (REs), and
all REs in the each symbol of the SSB, except REs within a first frequency guard band between any two of the PSS, the SSS, and the PBCH in the each symbol of the SSB, have non-zero values; and
transmitting the SSB in the SSB resources as a beamformed SSB.

2. The method of claim 1, wherein a first time duration of the PSS is equal to a total time duration of the SSB.

3. The method of claim 1, wherein within the SSB, the PSS is multiplexed with the SSS and the PBCH in time or in time and frequency.

4. The method of claim 1, wherein the SSB is a first SSB of a plurality of SSBs in an SSB burst set, the method further comprising:
mapping a first symbol of the first SSB to an nth symbol of a slot, where n is an integer that is greater than or equal to two and less than or equal to a total number of time units in the first SSB.

5. The method of claim 1, further comprising:
obtaining a neighbor SSB measurement timing configuration (SMTC) data based on a configured neighbor SSB resource area, each symbol in the configured neighbor SSB resource area having an equal number of resource elements (REs), and all REs in the each symbol in the configured neighbor SSB resource area, except REs within a second frequency guard band between any two of a neighbor PSS, a neighbor SSS, and a neighbor PBCH in the configured neighbor SSB resource area, have non-zero values;
transmitting, to at least one user equipment (UE), the neighbor SMTC data; and
receiving, from the at least one UE, at least one of: a layer 1 (L1) measurement report, or a layer 3 (L3) measurement report based on measured SSB reference signals (SSB-RSs) within the configured neighbor SSB resource area.

6. The method of claim 1, wherein the PSS spans $T_{PSS}$ time units, $T_{PSS}$ is greater than one, the PSS occupies $F_{PSS}$ frequency units, and the PSS is expressed as a PSS sequence, the method further comprising:
partitioning the PSS sequence into $T_{PSS}$ segments; and
mapping each of the $T_{PSS}$ segments to the $F_{PSS}$ frequency units at each of the $T_{PSS}$ time units.

7. The method of claim 6, wherein:
each of the $T_{PSS}$ segments is associated with a respective base sequence of length $L_{PSS}$, and
$L_{PSS}$ is greater than one and less than or equal to $k*F_{PSS}$, k being a constant equal to a quantity of resource elements per frequency unit expressed in units of resource elements (REs), RE groups, physical resource blocks (PRBs), or PRB groups.

8. The method of claim 6, wherein:
each of the $T_{PSS}$ segments is associated with a respective base sequence, and
the respective base sequence is configurable to be padded with zeros, or extended cyclically, to a length equal to $k*F_{PSS}$, k being a constant equal to a quantity of resource elements per frequency unit expressed in units of resource elements (REs), RE groups, physical resource blocks (PRBs), or PRB groups.

9. The method of claim 1, wherein the PSS spans $T_{PSS}$ time units, $T_{PSS}$ is greater than one, the PSS occupies $F_{PSS}$ frequency units, and the PSS is expressed as a PSS sequence associated with a cell-specific or zone-specific base sequence of length $M_{PSS}$, the cell-specific or zone-specific base sequence of length $M_{PSS}$ is configurable to be padded with zeros, or cyclically extended, to a length equal to $T_{PSS}*k*F_{PSS}$, k being a constant equal to a quantity of resource elements per frequency unit expressed in units of resource elements (REs), RE groups, physical resource blocks (PRBs), or PRB groups, the method further comprising:
partitioning the cell-specific or zone-specific base sequence of length $M_{PSS}$ uniformly into $T_{PSS}$ segments; and
mapping each of the $T_{PSS}$ segments to the $F_{PSS}$ frequency units at each of the $T_{PSS}$ time units.

10. The method of claim 1, wherein the PSS spans $T_{PSS}$ time units, $T_{PSS}$ is greater than one, the PSS occupies $F_{PSS}$ frequency units, and the PSS is expressed as a PSS sequence associated with multiple repetitions of a cell-specific or zone-specific base sequence of length $L_{PSS}$, the method further comprising:
repeating the cell-specific or zone-specific base sequence of length $L_{PSS}$ $T_{PSS}$ times;
weighting each respective repetition of the $T_{PSS}$ repetitions with a respective non-zero symbol α of a code cover;
padding with zeros, or cyclically extending, each respective weighted repetition of the $T_{PSS}$ repetitions to a length equal to $k*F_{PSS}$, k being a constant equal to a quantity of resource elements per frequency unit expressed in units of resource elements (REs), RE groups, physical resource blocks (PRBs), or PRB groups; and
mapping each respective weighted and padded or cyclically extended repetitions of the $T_{PSS}$ repetitions to the $F_{PSS}$ frequency units at each of the $T_{PSS}$ time units.

11. A network entity, comprising:
one or more memories; and
one or more processors being configured to, individually or collectively, based at least in part on information stored in the one or more memories:
configure a synchronization signal block (SSB) using SSB resources that convey a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels, wherein:
a product of the first configured integer number and the second configured integer number is a predetermined constant value,
each symbol of the SSB has an equal number of resource elements (REs), and
all REs in the each symbol of the SSB, except REs within a first frequency guard band between any two of the PSS, the SSS, and the PBCH in the each symbol of the SSB, have non-zero values; and
transmit the SSB in the SSB resources as a beamformed SSB.

12. The network entity of claim 11, wherein a first time duration of the PSS is equal to a total time duration of the SSB.

13. The network entity of claim 11, wherein within the SSB, the PSS is multiplexed with the SSS and the PBCH in time or in time and frequency.

14. The network entity of claim 11, wherein the SSB is a first SSB of a plurality of SSBs in an SSB burst set, the one or more processors being further configured to:
map a first symbol of the first SSB to an nth symbol of a slot, where n is an integer that is greater than or equal to two and less than or equal to a total number of time units in the first SSB.

15. The network entity of claim 11, wherein the one or more processors, individually or collectively, are further configured to:
obtain a neighbor SSB measurement timing configuration (SMTC) data based on a configured neighbor SSB resource area, each symbol in the configured neighbor SSB resource area having an equal number of resource elements (REs), and all REs in the each symbol in the configured neighbor SSB resource area, except REs within a second frequency guard band between any two of a neighbor PSS, a neighbor SSS, and a neighbor PBCH in the configured neighbor SSB resource area, have non-zero values;
transmit, to at least one user equipment (UE), the neighbor SMTC data; and
receive, from the at least one UE, at least one of: a layer 1 (L1) measurement report, or a layer 3 (L3) measurement report based on measured SSB reference signals (SSB-RSs) within the configured neighbor SSB resource area.

16. The network entity of claim 11, wherein the PSS spans $T_{PSS}$ time units, $T_{PSS}$ is greater than one, the PSS occupies $F_{PSS}$ frequency units, and the PSS is expressed as a PSS sequence, the one or more processors being further configured to:
partition the PSS sequence into $T_{PSS}$ segments; and
map each of the $T_{PSS}$ segments to the $F_{PSS}$ frequency units at each of the $T_{PSS}$ time units.

17. The network entity of claim 16, wherein:
each of the $T_{PSS}$ segments is associated with a respective base sequence of length $L_{PSS}$, and
$L_{PSS}$ is greater than one and less than or equal to $k*F_{PSS}$, k being a constant equal to a quantity of resource elements per frequency unit expressed in units of resource elements (REs), RE groups, physical resource blocks (PRBs), or PRB groups.

18. The network entity of claim 16, wherein:
each of the $T_{PSS}$ segments is associated with a respective base sequence, and
the respective base sequence is configurable to be padded with zeros, or extended cyclically, to a length equal to $k*F_{PSS}$, k being a constant equal to a quantity of resource elements per frequency unit expressed in units of resource elements (REs), RE groups, physical resource blocks (PRBs), or PRB groups.

19. The network entity of claim 11, wherein the PSS spans $T_{PSS}$ time units, $T_{PSS}$ is greater than one, the PSS occupies $F_{PSS}$ frequency units, and the PSS is expressed as a PSS sequence associated with a cell-specific or zone-specific base sequence of length $M_{PSS}$, the cell-specific or zone-specific base sequence of length $M_{PSS}$ is configurable to be padded with zeros, or cyclically extended, to a length equal to $T_{PSS}*k*F_{PSS}$, k being a constant equal to a quantity of resource elements per frequency unit expressed in units of resource elements (REs), RE groups, physical resource blocks (PRBs), or PRB groups, the one or more processors being further configured to:
  partition the cell-specific or zone-specific base sequence of length $M_{PSS}$ uniformly into $T_{PSS}$ segments; and
  map each of the $T_{PSS}$ segments to the $F_{PSS}$ frequency units at each of the $T_{PSS}$ time units.

20. The network entity of claim 11, wherein the PSS spans $T_{PSS}$ time units, $T_{PSS}$ is greater than one, the PSS occupies $F_{PSS}$ frequency units, and the PSS is expressed as a PSS sequence associated with multiple repetitions of a cell-specific or a zone-specific base sequence of length $L_{PSS}$, the one or more processors being further configured to:
  repeat the cell-specific or zone-specific base sequence of length $L_{PSS}$ $T_{PSS}$ times;
  weight each respective repetition of the $T_{PSS}$ repetitions with a respective non-zero symbol $\alpha$ of a code cover;
  pad with zeros, or cyclically extend, each respective weighted repetition of the $T_{PSS}$ repetitions to a length equal to $k*F_{PSS}$, k being a constant equal to a quantity of resource elements per frequency unit expressed in units of resource elements (REs), RE groups, physical resource blocks (PRBs), or PRB groups; and
  map each respective weighted and padded or cyclically extended repetitions of the $T_{PSS}$ repetitions to the $F_{PSS}$ frequency units at each of the $T_{PSS}$ time units.

21. A method, at a user equipment, comprising:
receiving, from a network entity, a synchronization signal block (SSB) conveying a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels, wherein:
  a product of the first configured integer number and the second configured integer number is a predetermined constant value,
  each symbol of the SSB has an equal number of resource elements (REs), and
  all REs in the each symbol of the SSB, except REs within a first frequency guard band between any two of the PSS, the SSS, and the PBCH in the each symbol of the SSB, have non-zero values; and
transmitting, to the network entity, at least one of: a layer 1 (L1) measurement report, or a layer 3 (L3) measurement report based on measurements of SSB reference signals (SSB-RSs) within the SSB resource area.

22. The method of claim 21, wherein a first time duration of the PSS is less than or equal to a total time duration of the SSB.

23. The method of claim 21, wherein within the SSB, the PSS is multiplexed with the SSS and the PBCH in time, or time and frequency.

24. The method of claim 21, wherein the SSB is a first SSB of one of a plurality of SSBs in an SSB burst, the method further comprising:
  locating a first symbol of the first SSB at an nth symbol of a slot, where n is an integer that is greater than or equal to two and less than or equal to a total number of time units in the first SSB.

25. The method of claim 21, further comprising:
  receiving, from the network entity, a neighbor SSB measurement timing configuration (SMTC) data based on a configured neighbor SSB resource area, each symbol in the configured neighbor SSB resource area having an equal number of resource elements (REs), and all REs in the each symbol in the configured neighbor SSB resource area, except REs within a second frequency guard band between any two of a neighbor PSS, a neighbor SSS, and a neighbor PBCH in the configured neighbor SSB resource area, have non-zero values;
  measuring SSB reference signals (SSB-RSs) of SSBs located using the SMTC data; and
  transmitting, to the network entity, at least one of: a layer 1 (L1) measurement report, or a layer 3 (L3) measurement report based on the measured SSB-RSs within the configured neighbor SSB resource area.

26. A user equipment, comprising:
one or more memories; and
one or more processors being configured to, individually or collectively, based at least in part on information stored in the one or memories:
  receive from a network entity, a synchronization signal block (SSB) conveying a primary synchronization signal (PSS), a secondary synchronization signal (SSS), and a physical broadcast channel (PBCH) within an SSB resource area of a time-frequency resource grid bounded in time by a first configured integer number of time units and bounded in frequency by a second configured integer number of physical channels, wherein:
    a product of the first configured integer number and the second configured integer number is a predetermined constant value,
    each symbol of the SSB has an equal number of resource elements (REs), and
    all REs in the each symbol of the SSB, except REs within a first frequency guard band between any two of the PSS, the SSS, and the PBCH in the each symbol of the SSB, have non-zero values; and
  transmit, to the network entity, at least one of: a layer 1 (L1) measurement report, or a layer 3 (L3) measurement report based on measurements of SSB reference signals (SSB-RSs) within the SSB resource area.

27. The user equipment of claim 26, wherein a first time duration of the PSS is less than or equal to a total time duration of the SSB.

28. The user equipment of claim 26, wherein within the SSB, the PSS is multiplexed with the SSS and the PBCH in time, or time and frequency.

29. The user equipment of claim 26, wherein the SSB is a first SSB of one of a plurality of SSBs in an SSB burst, the one or more processors being further configured to:
  locate a first symbol of the first SSB at an nth symbol of a slot, where n is an integer that is greater than or equal to two and less than or equal to a total number of time units in the first SSB.

30. The user equipment of claim 26, wherein the one or more processors, individually or collectively, are further configured to:
  receive, from the network entity, a neighbor SSB measurement timing configuration (SMTC) data based on a configured neighbor SSB resource area, each symbol in the configured neighbor SSB resource area having an equal number of resource elements (REs), and all REs in the each symbol in the configured neighbor SSB resource area, except REs within a second frequency guard band between any two of a neighbor PSS, a neighbor SSS, and a neighbor PBCH in the configured neighbor SSB resource area, have non-zero values;

measure SSB reference signals (SSB-RSs) of SSBs located using the SMTC data; and transmit, to the network entity, at least one of: a layer 1 (L1) measurement report, or a layer 3 (L3) measurement report based on the measured SSB-RSs within the configured neighbor SSB resource area.

* * * * *